United States Patent
Futami et al.

(10) Patent No.: US 7,641,871 B2
(45) Date of Patent: Jan. 5, 2010

(54) FINE CHANNEL DEVICE AND A CHEMICALLY OPERATING METHOD FOR FLUID USING THE DEVICE

(75) Inventors: Toru Futami, Yokohama (JP); Tomohiro Ohkawa, Sagamihara (JP); Tomoyuki Oikawa, Zama (JP); Akira Kawai, Sagamihara (JP); Koji Katayama, Yamato (JP); Keiichiro Nishizawa, Yokohama (JP)

(73) Assignee: Tosoh Corporation, Shunan-shi (JP)

( * ) Notice: Subject to any disclaimer, the term of this patent is extended or adjusted under 35 U.S.C. 154(b) by 472 days.

(21) Appl. No.: 10/615,976

(22) Filed: Jul. 10, 2003

(65) Prior Publication Data

US 2004/0028580 A1 Feb. 12, 2004

(30) Foreign Application Priority Data

| Jul. 12, 2002 | (JP) | ............................. 2002-204271 |
| Jul. 16, 2002 | (JP) | ............................. 2002-206745 |
| Sep. 25, 2002 | (JP) | ............................. 2002-279149 |
| Feb. 10, 2003 | (JP) | ............................. 2003-032532 |

(51) Int. Cl.
*B01J 8/00* (2006.01)
*B01J 19/00* (2006.01)
*B01J 19/08* (2006.01)

(52) U.S. Cl. .................. 422/199; 422/198; 422/234; 422/211; 422/130

(58) Field of Classification Search ........................ None
See application file for complete search history.

(56) References Cited

U.S. PATENT DOCUMENTS 4,894,146 A * 1/1990 Giddings .................. 209/12.2
6,306,658 B1 * 10/2001 Turner et al. .............. 436/37
6,368,871 B1 4/2002 Christel et al.
2003/0226806 A1 * 12/2003 Young et al. ............... 210/634

FOREIGN PATENT DOCUMENTS

| JP | 10-507962 | 8/1998 |
| JP | 2002-1102 | 1/2002 |
| WO | WO 96/12541 | 5/1996 |
| WO | WO 9909042 A2 * | 2/1999 |
| WO | WO 9922858 A1 * | 5/1999 |
| WO | WO 00/22434 | 4/2000 |
| WO | WO 03/103836 | 12/2003 |

OTHER PUBLICATIONS

H. Hisamoto, et al., "Fast and High Conversion Phase-Transfer Synthesis Exploiting the Liquid-Liquid Interface Formed in a Microchannel Chip", Chem. Commun., 2001, pp. 2662-2663.

(Continued)

*Primary Examiner*—Jennifer A Leung
(74) *Attorney, Agent, or Firm*—Oblon, Spivak, McClelland, Maier & Neustadt, L.L.P.

(57) ABSTRACT

A fine channel device including a fine channel provided with at least two inlet ports for feeding fluid, inlet channels communicated with the inlet ports, a confluent portion communicated with the inlet channels, a branch portion communicated with the fine channel, from which at least two outlet channels are branched to feed predetermined amounts of fluid, and outlet ports communicated with the outlet channels. The fine channel is provided with a plurality of partition walls arranged along a boundary formed by at least two kinds of fluid fed from the inlet ports so as not to cause mutual contamination of fluid. Furthermore, the plurality of partition walls are spaced apart at intervals in a flowing direction of fluid.

26 Claims, 17 Drawing Sheets

OTHER PUBLICATIONS

Y. Shimizu, et al., "Formation of a Partition Film of Copolymer in a Microchannel", $3^{rd}$ Chemical and Microsystem, Society, 2001, p. 11.

Y. Shimizu, et al., "Formation and Application of a Structure of Copolymer Film in Microchannel", $5^{th}$ Chemical and Microsystem Society, 2002, p. 37.

A. Hibara, et al., "Development in the Formation of Three-dimensionally Crossing Multilayer Streams", $3^{rd}$ Chemical and Microsystem Society, 2001, p. 55.

T. Fujii, et al., "Integrated Microchips for Biochemical Reaction", vol. 20, 2001, pp. 99-105.

* cited by examiner

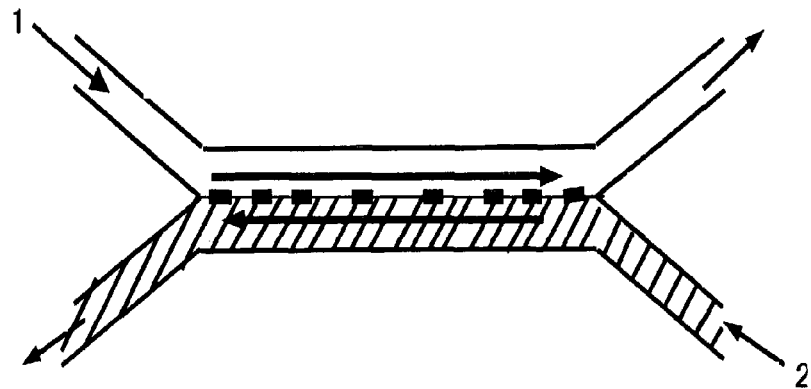
Fig. 9
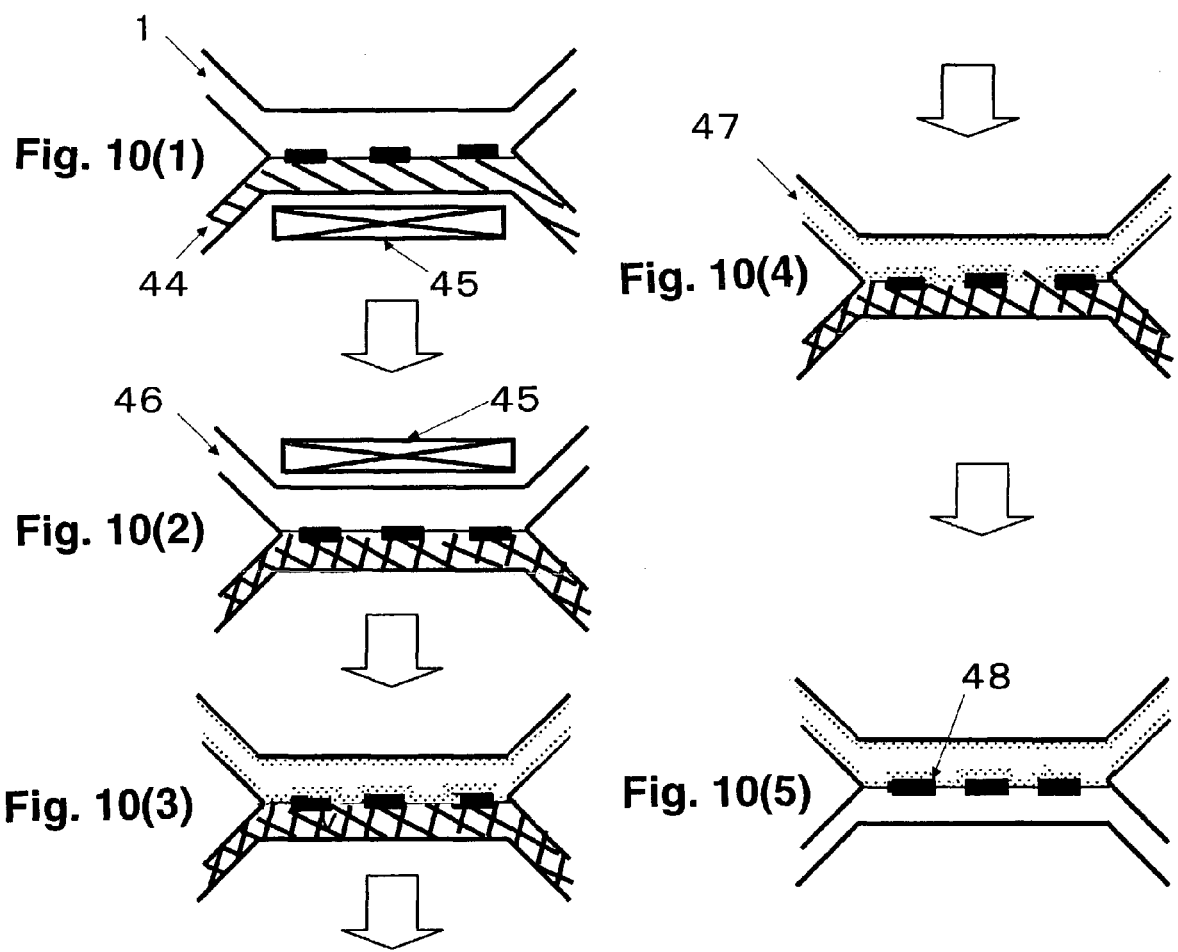
Fig. 10(1)
Fig. 10(2)
Fig. 10(3)
Fig. 10(4)
Fig. 10(5)

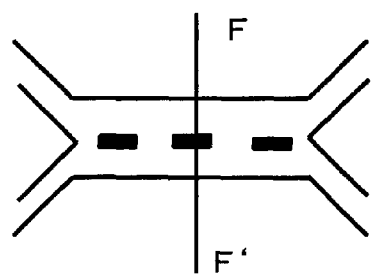
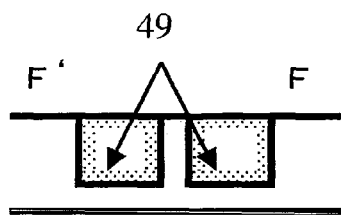 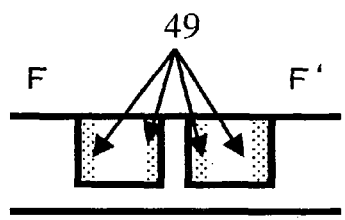 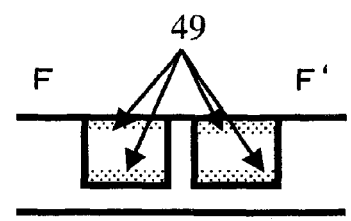
Fig. 11(a)  Fig. 11(b)  Fig. 11(c)

Gladysz reaction
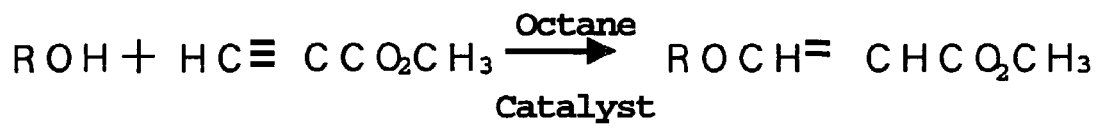
Catalyst P [CH$_2$CH$_2$(CF$_2$)$_7$CF$_3$]$_3$
Yamamoto reaction
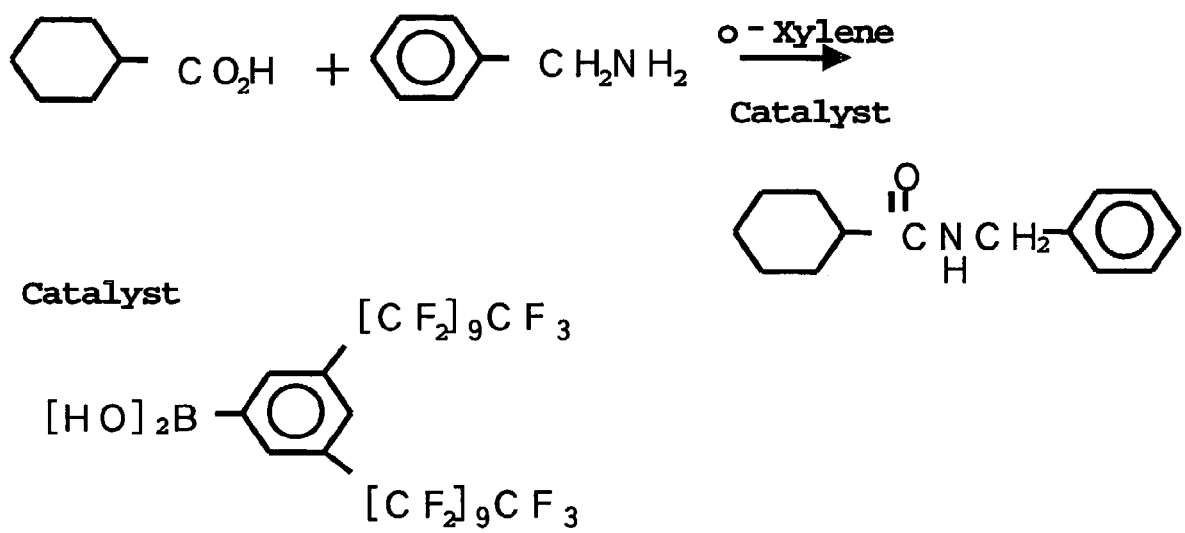
Fig. 16

FINE CHANNEL DEVICE AND A CHEMICALLY OPERATING METHOD FOR FLUID USING THE DEVICE

The present invention relates to a fine channel device having a fine channel for conducting a chemical reaction, forming droplets or analysis, in particular, a fine channel device suitable for mixing or a chemical reaction of fluid fed into the fine channel, and solvent extraction or separation or recovering a catalyst from a product, and a chemical operating method using such fine channel device.

In recent years, research for a chemical reaction by using a fine channel device comprising a glass substrate of several cm square provided with a fine channel having a length of several cm and a width and a depth of from sub-μm to several hundred μm wherein fluid is fed to the fine channel, has been noted. It is reported that in such fine channel, a rapid diffusion of molecules takes place due to effects of a short diffusion distance of a molecule and a large specific interfacial area in a fine space whereby a very efficient chemical reaction can be conducted without a special stirring operation, or a compound obtained by a chemical reaction can rapidly be extracted or separated by a solvent extraction/separation method from a reaction phase to an extraction phase whereby a side reaction which may occur subsequently can be suppressed (see, for example, the publication entitled: "Fast and high conversion phase-transfer synthesis exploiting the liquid-liquid interface formed in a microchannel chip" by H. Hisamoto et al., Chem. Commun., published in 2001, pages 2662-2663). Here, the fine channel means generally a channel having dimensions of 50-300 μm in width and 10-100 μm in depth.

In the technique described in the above-mentioned document, a Y-letter like fine channel as shown in FIG. 1 is used. An aqueous phase 1 in which a raw material is dissolved and an organic phase 2 are introduced into the fine channel to cause a chemical reaction at the fluid boundary 3 of aqueous and organic phases formed at a Y-letter like confluent portion. The Reynolds number is generally less than 1 in a channel of microscale, and therefore, a laminar flow as shown in FIG. 1 is provided unless flow rates are exceptionally increased. Further, since the diffusion time of molecules is in proportion to the second power of the width 9 of the fine channel, the mixing is accelerated by the diffusion of molecules, without positively mixing the reaction liquid, as the width of 9 of the fine channel is made much smaller, whereby a chemical reaction or solvent extraction is apt to occur. The fluid boundary is often called the laminar flow interfacial surface.

Further, it is generally reported that when a fluid outlet port 12 in the fine channel is formed to have a Y-letter shape as shown in FIG. 2, it is easy to separate an aqueous phase and an organic phase. The above-mentioned technique of separating completely the introduced fluid at the fluid outlet port and discharging it, performs very important functions that a chemical reaction or solvent extraction caused by the contact of at least two kinds of fluid in the fine channel is stopped completely at the branch portion of the fine channel, and the fluid fed once into the fine channel can be re-used.

In fact, however, the position of the fluid boundary is unstable and variable. In a first factor of causing a change of the position of the fluid boundary is due to a change of flow rate per unit time which is caused by a pump for supplying fluid as shown in FIGS. 3(*a*) and 3(*b*). This phenomenon will be explained using a Hagen-Poiseuille expression as the theoretical formula showing a pressure loss based on an internal friction of fluid by a laminar flow in a circular tube. In FIG. 4(*a*), assuming that fluid flows in a form of laminar flow at a linear velocity u (m/s) 5 in a horizontal circular tube 7 having a diameter d (m) 6. Then, the pressure loss $\Delta P$ (Pa) as a difference of pressures P1 and P2 acting on both end planes 8 of the circular tube is expressed by Formula 1 of the Hagen-Poiseuille formula:

$$\Delta P = P2 - P1 = 32\,\mu L u / d^2 \qquad \text{(Formula 1)}$$

where $\mu$(Pa·s) represents a viscosity coefficient and L(m) represents a channel length 10. When two kinds of fluid A (13) and fluid B (14) flow in a form of laminar flow forming the fluid boundary in the fine channel as shown in FIG. 4(*b*), Formula 1 is established to each fluid, and pressure losses $\Delta P_A$ and $\Delta P_B$ of the fluid A and the fluid B are indicated by Formula 2 and Formula 3, respectively:

$$\Delta P_A = 32\,\mu_A L u_A / d_A^2 \qquad \text{(Formula 2)}$$

$$\Delta P_B = 32\,\mu_B L u_B / d_B^2 \qquad \text{(Formula 3)}$$

where $\mu_A$, $u_A$ and $d_A$ represent a viscosity coefficient, a linear velocity 5 and a fluid width 33 of the fluid A, and $\mu_B$, $u_B$ and $d_B$ represent a viscosity coefficient, a linear velocity and a fluid width of the fluid B respectively. Since the fluid A and the fluid B flow in the same fine channel having a channel width D (m) 22, $\Delta P_A$ and $\Delta P_B$ are well balanced, and Formula 4 is established:

$$\mu_A u_A / d_A^2 = \mu_B u_B / d_B^2 \qquad \text{(Formula 4)}$$

Further, the relation of the linear velocity u (m/s) to a flow rate v (μL/min) is expressed by Formula 5:

$$u = 1.67 \times 10^{-11} \cdot v/S \qquad \text{(Formula 5)}$$

where S (m²) represents a cross-sectional area perpendicular to a flowing direction of fluid. When the above-mentioned relation is substituted into Formula 4, the following Formula 6 is provided:

$$\mu_A v_A / S_A d_A^2 = \mu_B v_B / S_B d_B^2 \qquad \text{(Formula 6)}$$

where $V_A$ and $V_B$ represent flow rates of the fluid A and the fluid B respectively, and $S_A$ and $S_B$ represent cross-sectional areas perpendicular to a flowing direction of the fluid A and the fluid B respectively. Further, since the cross-sectional area S (m²) is in proportion to the second power of the fluid width d (m), the following Formula 7 is established:

$$\mu_A v_A / d_A^4 = \mu_B v_B / d_B^4 \qquad \text{(Formula 7)}$$

Since the fluid A and the fluid B flow in the same fine channel having a channel width D (m), the following Formula 8 is established:

$$D = d_A + d_B \qquad \text{(Formula 8)}$$

Here, assuming that the viscosity of each of the fluid A and the fluid B does not change. When the flow rate of the fluid A changes to take a larger value, $V_A$ increases and at the same time $d_A$ increases to keep a balance in Formula 7. When $d_A$ increases, $d_B$ becomes smaller and at the same time, $v_B$ becomes smaller because the channel width D is constant. Then, the balance of Formula 7 can be maintained. Accordingly, the position of the fluid boundary varies due to a change of the flow rate per unit time caused by the fluid supply pump. The above explanation is made on the assumption that the viscosity of each of the fluid A and the fluid B does not change. However, even when viscosities of the fluid A and the fluid B change in the progress of a chemical reaction or solvent extraction, the position of the fluid boundary varies according to changes of $d_A$ and $d_B$ because a balance is maintained in Formula 7.

A second factor that the position of the fluid boundary is unstable and varies is caused by a wraparound phenomenon of fluid due to a difference of affinity between the inner wall of the fine channel and fluid to be supplied, as shown in FIG. 3(c). For example, when an aqueous phase 1 and an organic phase 2 are supplied into a fine channel made of glass as shown in FIG. 3(b), the aqueous phase flows toward a side of the inner wall of the channel so as to surround gradually an outer side of the organic phase as shown in FIG. 3(b) because the affinity of the aqueous phase to glass is higher than that of the organic phase. If the phases are branched at the branch portion of the fine channel in such state, the aqueous phase is mixed to the organic phase and vice versa.

Because of the above-mentioned factors, it is not easy to stably form the fluid boundary 3 as shown in FIG. 2 in the fine channel. In particular, when fluid is supplied at a low flow rate to obtain a long stay time of fluid in the fine channel so that a chemical reaction time or a solvent extraction time in the fine channel can be prolonged, fluctuation in the fluid supply rate or a wraparound phenomenon of fluid is apt to occur.

In order to stabilize the fluid boundary of at least two kinds of fluid supplied to a fine channel, a fine channel structure is proposed wherein a guide-like portion 16 having a height of about 20% or less as much as the depth of a channel 17 is formed in a bottom surface 18 of the fine channel as shown in FIG. 5(a) (see, for instance, a patent document 1 (Japanese Unexamined Patent Publication No. 2002-1102) and a patent document 2 (WO96/12541), for example). The formation of such guide-like portion in the bottom surface of the fine channel can suppress to a certain extent the fluctuation of the position of the fluid boundary 3 shown in FIG. 3(a). However, it is impossible to suppress sufficiently the wraparound phenomenon 15 of fluid due to the difference of affinity between the inner wall of the fine channel and the fluid to be supplied, as shown in FIG. 3(b). Accordingly, it was very difficult to discharge at least two kinds of fluid separately without the mixing of fluid through outlet ports in the fine channel even though the fine channel having the guide-like portion in the bottom surface of the fine channel was used.

Namely, in the conventional technique, there was fluctuation in the position of the fluid boundary due to a change of the flow rate per unit time, which was caused by the fluid supply pump whereby a laminar flow could not be maintained, and a wraparound phenomena of fluid took place due to a difference of affinity between the inner wall of the fine channel and the fluid to be supplied. Accordingly, a kind of fluid was caused to be mixed with another kind of fluid to be discharged through an outlet port of the fine channel, and it is impossible to stop completely a chemical reaction or solvent extraction which is caused by the mutual contact of fluid in the fine channel at the branch portion of the fine channel. Further, in order to reuse the fluid supplied once to the fine channel, it was necessary to separate a mixture comprising at least two kinds of fluid discharged from an outlet port. According to the conventional technique, however, it was difficult to easily reuse the fluid.

Further, as described before, when at least two kinds of fluid were passed through the fine channel, it was difficult to separate sufficiently without causing mixing between adjacent flows of fluid. Accordingly, a contact time of fluid, i.e., a mixing time and/or a time of chemical reaction, of the adjacent flows of fluid in the fine channel wherein the contact time of fluid is determined by a length of the fine channel and/or a flow rate of fluid, could not be determined only in the fine channel. Therefore, the mixing and/or the chemical reaction of fluid could not be stopped only in the fine channel whereby the mixing and/or the chemical reaction of fluid progressed even after the passing through the fine channel. For example, the production of a by-product by a consecutive reaction proceeded after the fluid was out of the fine channel to thereby cause a reduction of yield. Thus, the primary performance of the fine channel, i.e., the control of a consecutive reaction or suppression of a side reaction could not be obtained (see, for example, the above-referred non-patent document 1).

Further, since it was difficult to separate sufficiently at least two kinds of fluid without causing mixing between adjacent flows of fluid after they were passed through the fine channel as described above, a contact time of fluid, i.e., a time of solvent extraction in which an extracted material in an extracted solvent is extracted into an extracting solvent, between adjacent flows of fluid in the fine channel, the contact time being determined by a length of the fine channel and/or a flow rate of fluid, could not be determined only in the fine channel. Therefore, the process of the solvent extraction could not be stopped in the fine channel whereby the solvent extraction proceeded even after at least two kinds of fluid had passed through the fine channel. For example, the mixing proportion of fluid varied at the outside of the fine channel, and it was impossible to conduct the solvent extraction keeping a predetermined volume ratio of the extracted solvent to the extracting solvent. Further, it was difficult to separate sufficiently the extracting solvent used for solvent extraction in the fine channel from the extracted solvent outside the fine channel. Here, the solvent extraction means the extraction of a material to be extracted in an extracted solvent into an extracting solvent as described above. In the present invention, however includes the feature that a liquid phase comprising liquid is vaporized and the vaporized phase is brought into a gas phase comprising gas which is adjacent to the liquid phase.

Recently, there has been attempted a selectively permeating technique in which a substance in a kind of fluid is selectively collected through a film formed at a fluid boundary which is formed by passing at least two kinds of fluid flowing as laminar flows adjacently channel (see, for example, a non-patent document 2: "Formation of a partition film of copolymer in a microchannel", p. 11, preliminary papers of lecture by Yoshinori Shimizu et al. in the 3rd Chemical and Microsystem Society, published in 2001), or a technique of carrying a catalyst or an enzyme on said film to cause a catalytic reaction or an enzyme reaction (see, for example, a non-patent document 3: "Formation and application of a structure of copolymer film in microchannel", p. 37, preliminary papers for lecture by Yoshinori Shimizu et al. in the 5th Chemical and Microsystem Society, published in 2002). However, it was difficult to form such film along a flowing direction of fluid unless the fine channel had a short length such as about 1 mm or less. Accordingly, it was difficult to form a continuous film along the following direction of fluid in a longer fine channel.

Further, there has been attempted a technique of contacting adjacent laminar flows of fluid in a fine channel by supplying a plurality kinds of fluid in mutually opposite directions or by crossing them at an arbitrary angle (see, for example, the publication entitled: "Development in the formation of three-dimensionally crossing multilayer streams", p. 55, preliminary papers for lecture by Akihide Hibara et al. in the 3rd Chemical and Microsystem Society, published in 2001). In such technique, there is an expectation regarding the capability of changing a balance in a chemical reaction or solvent extraction by avoiding the flow of the same direction between adjacent flows of fluid. The above-mentioned Hibara et al. publication shows an experimental result in which a fine channel made of glass having a length of about 1 mm or less wherein a side portion of the inner wall of the fine channel which has originally hydrophilic properties is modified by trichlorooctadecylsilane which is generally known as a hydrophobic modifier, is used. Thus, it was difficult to make adjacent laminar flows of fluid contact in the fine channel by supplying them in mutually opposite directions or crossing them at an arbitrary angle. In particular, it was very difficult to realize the above-mentioned operations in a fine channel having a longer distance. There was no possibility of conducting experiments for verification as to whether or not a balance in a chemical reaction or solvent extraction could be changed by such operations.

Further, in order to modify the fine channel as proposed in Hibara et al. publication noted above, a plurality of processes such as a pre-washing process, a modifier supplying process, a modifier stabilizing process, a post-washing process and so on were needed. Such fine channel modification required much time and cost, and the durability of the modifier was only about 1 to 4 weeks. Accordingly, there was no fine channel capable of assuring a semipermanent supply of fluid.

Further, in the fine channel as shown in FIG. 1, a chemical reaction took place mainly at the fluid boundary 3 (see, for example, the publication entitled: "An integration type microreactor chip", p. 99-105, vol. 20 by Fujii et al., published in 2001). Accordingly, the diffusion effect of molecules brought only the accumulation of a reaction product at the fluid boundary, and the above-mentioned effects of providing an effective chemical reaction as a feature of the chemical reaction in a fine space, a rapid solvent extraction/separation and control of a side reaction, could not sufficiently be obtained. Although the diffusion time of molecules can further be shortened by narrowing the width 9 of the fine channel, and the accumulation of a reaction product at the fluid boundary can be suppressed as described before, the pressure loss increases as the width of the fine channel is narrowed. Accordingly, the fluid supply itself becomes difficult and it was not realistic.

Further, in an attempt of disturbing positively the fluid boundary to accelerate the mixing, there is a possibility of obtaining an efficiency chemical reaction because a reaction product can uniformly be distributed in the fine channel. However, a fluid mixture became suspension whereby the reaction product could not easily be separated from the reaction phase, and effects of solvent extraction/separation and the suppression of a side reaction could not sufficiently be obtained.

In a chemical reaction using a catalyst according to a conventional technique, there are a non-uniform catalytic reaction in which a reaction product and a catalyst are in different phases and a uniform catalytic reaction in which a reaction product and a catalyst are in the same phase to proceed a catalytic reaction. As the catalyst used in the non-uniform catalytic reaction, a solid catalyst is often used. For example, liquid or gas containing a reaction product is supplied continuously to the solid catalyst to proceed a chemical reaction.

Accordingly, the non-catalytic reaction is advantageous in that operations of separating the catalyst and the reaction product are unnecessary and a large scale production is possible. However, it has disadvantages that the reaction efficiency is lower than that of the uniform catalytic reaction because the catalytic activity takes place only on the surface of the solid catalyst and the selectivity to the reaction product is poor.

On the other hand, the uniform catalytic reaction is advantageous in that the interfacial surface area of the catalyst to a reaction product is large because the chemical reaction generally takes place in a reaction vessel in which a catalyst and a raw material are mixed in a suspension state, whereby the reaction efficiency is better than that of the non-uniform catalytic reaction and the selectivity to the reaction product is good. However, operations to separate and recover the solvent, the catalyst and the reaction product by using a distillation or filtration technique after the completion of the reaction, are needed. Since the catalyst is generally soluble to the solvent, it is very difficult to separate for reuse the catalyst which is generally expensive.

Conventionally, as a technique of supplementing mutual advantages and disadvantages of the non-uniform catalytic reaction and the uniform catalytic reaction as mentioned above, there has been carried out a technique that a catalyst is supported on a carrier such as a polymer or an oxide to be non-uniformized, and after completion of the reaction, the carrier having the catalyst supported thereon is separated as it is. However, this technique had problems that the cost of an expensive catalyst was further increased by carrying the catalyst on the polymer or the oxide; an unstable state was caused thermally or chemically; a rapid elimination of heat as an advantage of the catalyst was difficult and reaction efficiency became worse.

Further, there has generally been carried out a chemical reaction in which an enzyme (a biocatalyst), as a kind of catalyst, contained in an aqueous phase is mixed with a substrate contained in an organic phase so that the substrate is hydrolyzed or esterified by the enzyme. In this case, there were problems that the activity of the catalyst was lost because the structure of the enzyme was changed mechanically when the mixing of the aqueous phase and the organic phase was carried out by mechanically stirring in order to increase the reaction efficiency, and the activity was lost because the nature of the catalyst was changed when the catalyst in a suspension state by stirring contacted with the organic phase.

It is an object of the present invention to provide a fine channel device with a fine channel having such structure that when at least two kinds of fluid are supplied to the fine channel, adjacent flows of fluid provide a stable fluid boundary in the fine channel, and the adjacent flows of fluid can be discharged separately through predetermined outlet ports without causing the mutual contamination of fluid.

It is an object of the present invention to provide a chemically operating method wherein the mixing, chemical reaction, solvent extraction, separation, catalyst recovery and so on can effectively be carried out by supplying simply at least two kinds of fluid in a flowing direction to make adjacent flows of fluid at the fluid boundary formed by the adjacent flows of fluid in the fine channel.

Further, it is an object of the present invention to provide a fine channel device capable of recovering a catalyst in a course of chemical reaction in a multilayer type catalytic reaction without losing the activity of the catalyst, the recovered catalyst being reused and a chemically operating method using such fine channel device.

The inventors of the present application propose a fine channel device comprising a fine channel provided with at least two inlet ports for feeding fluid, inlet channels communicated with the inlet ports, a confluent portion communicated with the inlet channels, a branch portion communicated with the fine channel, from which at least two outlet channels are branched to feed predetermined amounts of fluid, and outlet ports communicated with the outlet channels, the fine channel device being characterized in that the fine channel is provided with a plurality of partition walls arranged along a boundary formed by at least two kinds of fluid fed from the inlet ports so as not to cause mutual contamination of fluid, and have completed the invention, to solve the problems of conventional techniques.

Further, the problems of conventional techniques can be solved by conducting chemical operations such as the mixing or chemical reaction of fluid, solvent extraction/separation, catalyst recovery and so on by using such fine channel device.

In this specification, the expression "the boundary formed by at least two kind of fluid" means "the fluid boundary".

As described before, when said at least two kinds of fluid are fed at a low flow rate to prolong a staying time, i.e., a time of chemical reaction or a time of solvent extraction, in the fine channel, there is apt to occur a change of the flow rate and a wraparound phenomenon of fluid. This facts imply, on the other hand, that as the length of the fine channel is smaller, possibilities of the positional variation of the fluid boundary and the wraparound phenomenon of fluid due to a difference of affinity between the inner wall of the fine channel and fluid to be supplied, are smaller. This can be considered because the positional variation of the fluid boundary is small since the distance of contact of fluid and the contact time of fluid are short, and the degree of the wraparound of fluid due to the difference of affinity between the inner wall of the fine channel and the fluid to be supplied is small.

Accordingly, when operations as described below are repeated, i.e., at least two kinds of fluid are made contact mutually in the fine channel; these kinds of fluid are separated in a state that the positional variation of the fluid boundary formed by such fluid is small, and the wraparound of fluid due to the difference of affinity between the inner wall and the fluid is small, and then, said at least two kinds of fluid are made again contact with each other, it can be expected that the fluid boundary is maintained stably over the entire length of the fine channel; the wraparound phenomenon of fluid due to the difference of affinity can be prevented, and the at least two kinds of fluid can be separated at the branch portion of the fine channel without causing the mutual contamination of fluid.

Accordingly, as a preferred embodiment of the present invention, there is provided a fine channel device comprising a fine channel provided with at least two inlet ports for feeding fluid, inlet channels communicated with the inlet ports, a confluent portion communicated with the inlet channels, a branch portion communicated with the fine channel, from which at least two outlet channels are branched to feed predetermined amounts of fluid, and outlet ports communicated with the outlet channels, the fine channel device being characterized in that the fine channel is provided with a plurality of partition walls arranged along a boundary formed by at least two kinds of fluid fed from the inlet ports so as not to cause mutual contamination of fluid wherein partition walls are located at positions apart from the confluent portion and the branch portion, and the plurality of partition walls have the same height as the depth of the fine channel.

Here, the fluid means liquid or gas. Further, the separation of the at least two kinds of fluid means that there is no substantial mixing of a kind of fluid to another kind of fluid, more specifically, percentage of the mutual contamination is 10% or less.

The fine channel is generally a channel of a size having a width of 500 µm or less and a depth of 300 µm or less. Although widths and depths of the inlet channels and the outlet channels are not in particular limited, they may have the same width and depth as the fine channel. Further, although sizes of the inlet ports and the outlet ports are not in particular limited, they may have a diameter of from about 0.1 to several mm. The vicinity of the confluent portion of the inlet channel means a position 10 µm-500 µm apart from the confluent portion, and the vicinity of the branch portion of the outlet channel means a position 10 µm-500 µm apart from the branch portion.

The fine channel device of the present invention has such structure that when at least two kinds of fluid obtained by dissolving a reactive material to be obtained or a material to be extracted in a medium such as water, an organic solvent or the like are supplied to a fine channel formed in the fine channel device, said at least two kinds of fluid are fed maintaining laminar flows in a small space of fine channel; said at least two kinds of fluid are made mutual contact to cause the mixing, chemical reaction of fluid or solvent extraction by the diffusion of molecules, and each kind of fluid can be supplied to a predetermined outlet channel through the fine channel.

Accordingly, in a preferred embodiment of the present invention, there is provided a fine channel device comprising a fine channel provided with at least two inlet ports for feeding fluid, inlet channels communicated with the inlet ports, a confluent portion communicated with the inlet channels, a branch portion communicated with the fine channel, from which at least two outlet channels are branched to feed predetermined amounts of fluid, and outlet ports communicated with the outlet channels, the fine channel device being characterized in that the fine channel is provided with a plurality of partition walls arranged along a boundary formed by at least two kinds of fluid fed from the inlet ports so as not to cause mutual contamination of fluid wherein said plurality of partition walls are arranged with intervals in a flowing direction of fluid. Such structure can avoid mutual contamination of said at least two kinds of fluid by the presence of partition walls and assures an effective mixing or chemical reaction of fluid, solvent extraction, separation and so on due to the effect of diffusion of molecules between adjacent flows of fluid.

The purpose of forming the partition walls is to prevent the mutual contamination of adjacent flows of fluid in the fine channel. Accordingly, the height of each partition wall can be substantially equal to the depth of the fine channel or can be a height to such extent that a kind of fluid does not run over the partition wall to mix with the other kind of fluid. Specifically, it is preferable that the height of the partition wall is the same as the depth of the fine channel.

The fine channel device having the above-mentioned structure can suppress the positional variation of the fluid boundary due to a change of the flow rate caused by a fluid supply pump and can prevent the wraparound phenomenon of fluid due to a difference of affinity between the inner wall of the fine channel and the supplied fluid. Further, the fine channel device can discharge plural kinds of fluid through predetermined outlet ports of the fine channel without causing the mixing of fluid.

BRIEF DESCRIPTION OF THE DRAWINGS

In drawings:

FIG. 8 shows schematic plan views of partition walls formed in vicinities of the confluent portion and the branch portion of the fine channel according to several embodiments of the present invention wherein

FIG. 9 is a diagram showing a case that directions of two kinds of fluid flowing adjacently in the fine channel are opposite to each other;

FIGS. 10(1)-10(5) is a schematic flow diagram showing how a thin film of inorganic material is formed between adjacent partition walls in a flow direction of fluid in the fine channel device of the present invention;

FIG. 11 show diagrams of fine channels formed in the fine channel device of the present invention in cases that a metallic film is disposed in the fine channel, an upper portion of FIG. 11 being a diagram viewed from an upper portion;

FIG. 13 are diagrams showing means for supplying, discharging and recovering fluid by using the fine channel of the present invention wherein

FIG. 16 is a diagram showing a reaction system using a temperature dependence phase transfer catalyst;

In the following, preferred embodiments of the fine channel device of the present invention will be described in detail with reference to the drawings.

DESCRIPTION OF THE PREFERRED EMBODIMENTS

Figure 8A:
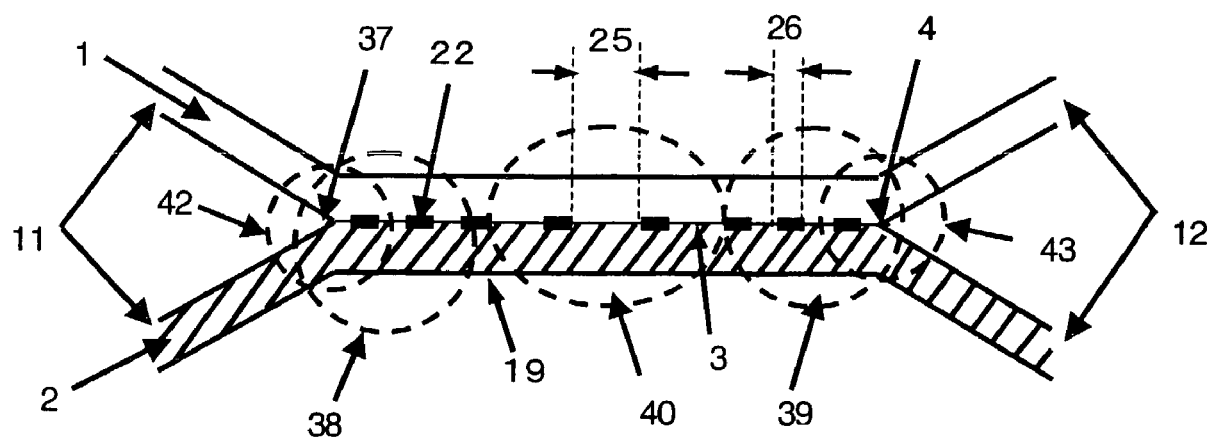
FIG. 8(a) shows a case that partition walls are formed apart from the confluent portion and the branch portion of the fine channel.
Figure 8B:
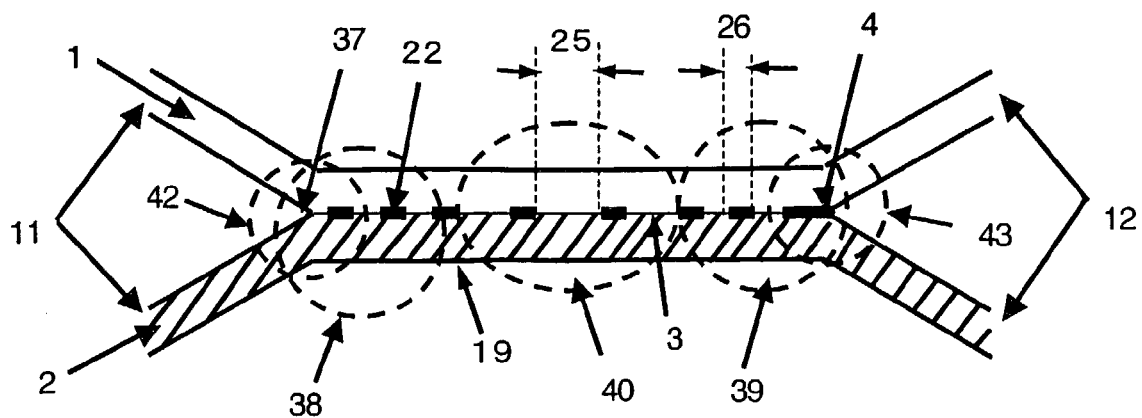
FIG. 8(b) shows a case that the partition wall formed closest to the branch portion of the fine channel is connected to the branch portion.
Figure 8C:
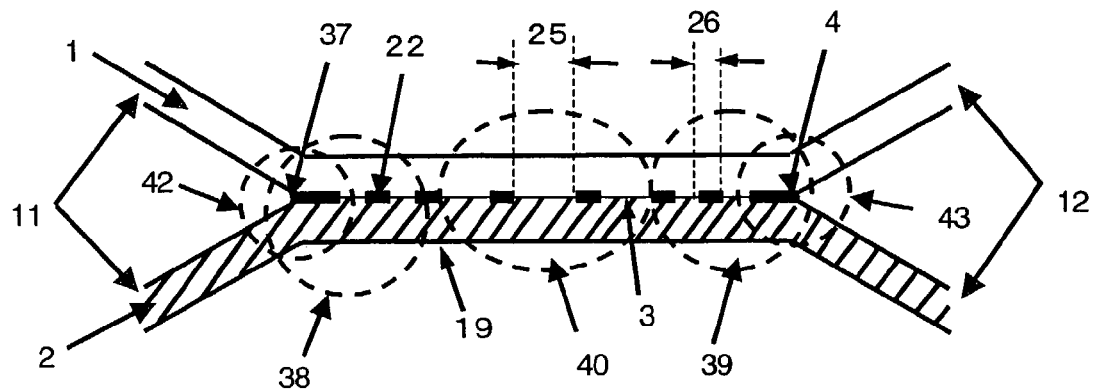
FIG. 8(c) shows a case that the partition wall formed closest to the confluent portion of the fine channel is connected to the confluent portion and the partition wall formed closest to the branch portion of the fine channel is connected to the branch portion.
Figure 8D:
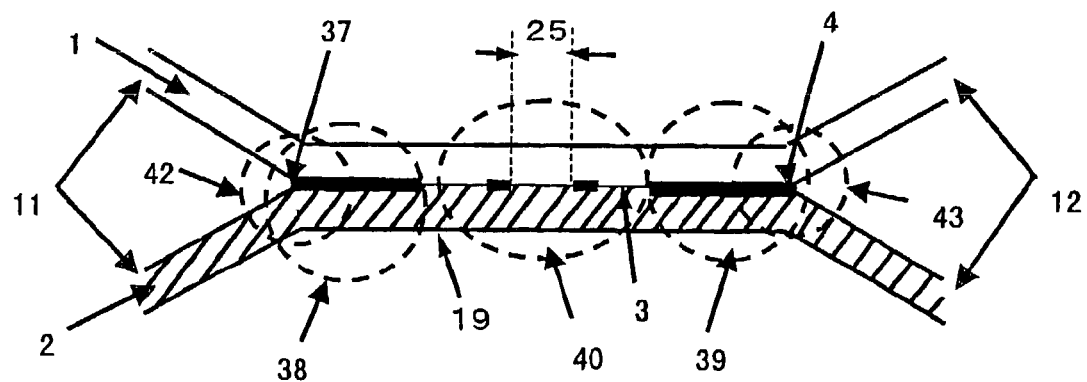
FIG. 8(d) shows a case that partition walls in vicinities of the confluent portion and the branch portion of the fine channel are respectively connected continuously in a following direction of fluid.

In the present invention, a plurality of partition walls are provided with intervals in the fine channel. With respect to the positional relation between a partition wall and the inlet channels and between a partition wall and the branch portion of the outlet channels, partition walls 22 may be formed at positions apart from the confluent portion 37 and the branch portion 4 as shown in FIG. 8(a). However, it is preferable as shown in FIG. 8(b) that the partition wall formed closest to the branch portion of the fine channel is connected to the branch portion. With such, two adjacent flows of fluid can be separated smoothly without causing mutual contamination of the two kinds of fluid. As an embodiment of the arrangement of the partition walls, there is at least one absent location of partition wall except the vicinity 42 of the confluent portion 37 and the vicinity 43 of the branch portion 4 of the fine channel. In a preferable embodiment, longer partition walls are formed in the vicinity of the confluent portion and the branch portion in FIG. 8(c), or partition walls are formed so as to continue from the confluent portion and the branch portion as shown in FIG. 8(d). Thus, by providing a partition wall in the vicinity of the confluent portion, the mixing between adjacent flows of fluid by mutual contact can be minimized, and by providing a partition wall in the vicinity of the branch portion, the mutual contamination between the adjacent flows of fluid caused by separating suddenly the adjacent flows of fluid can be minimized. The arrangement that there is at least one absent location of partition wall except the vicinity of the branch portion of the outlet channels means that at least two partition walls are formed with an interval in a flowing direction of fluid.

The formation of the partition walls can be carried out at the same time of shaping the fine channel by using a technique of etching, mechanically processing, molding or the like without using a large number of processes as used in a channel modification method. Accordingly, the time and cost for preparing the fine channel can substantially be reduced in comparison with the channel modification method. In particular, when the fine channel device of the present invention is prepared by molding a resin, ceramics or glass, the maximum effect of reducing the time and cost for preparing the fine channel can be obtained. Further, since the above-mentioned advantages and effects can be obtained by the specified shape of the fine channel formed in the fine channel device of the present invention, the fine channel device with the fine channel providing prolonged services, i.e., a semipermanent service life can be realized, in comparison with the fine channel by the channel modification method.

Figure 7:
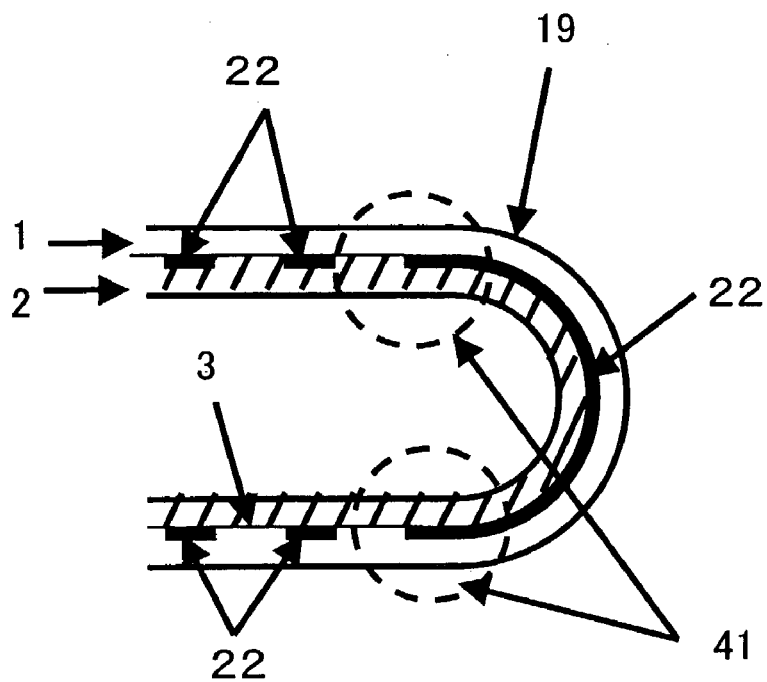
FIG. 7 is a schematic plan view showing the shape of a partition wall formed in a curved portion of fine channel according to the present invention.

The plurality of partition walls may have the same length or different length in a flowing direction of fluid. Further, distances between adjacent partition walls may be the same or different in a flowing direction of fluid. Further, it is desirable that as shown in FIG. 7, when a channel 19 has a shape other than the straight portion, a portion of a partition wall 22 extends continuously from the vicinity of a portion 41 originating a non-straight portion of fine channel to the vicinity 41 of a portion ending the non-straight portion of fine channel. Here, the vicinity means a distance of, preferably, 5,000 μm or less, however, it should not be limited thereto. For example, when two kinds of fluid are supplied to a curved fine channel, a kind of fluid flowing an inner side of the curved fine channel is forced to push the other kind of fluid flowing at an outer side due to a centrifugal force applicable to the fluid. As a result, the fluid flowing an inner side is contaminated with the fluid flowing an outer side in the curved fine channel. However, such phenomenon of contamination of fluid can be prevented by constituting the partition walls as described above.

Figure 1:
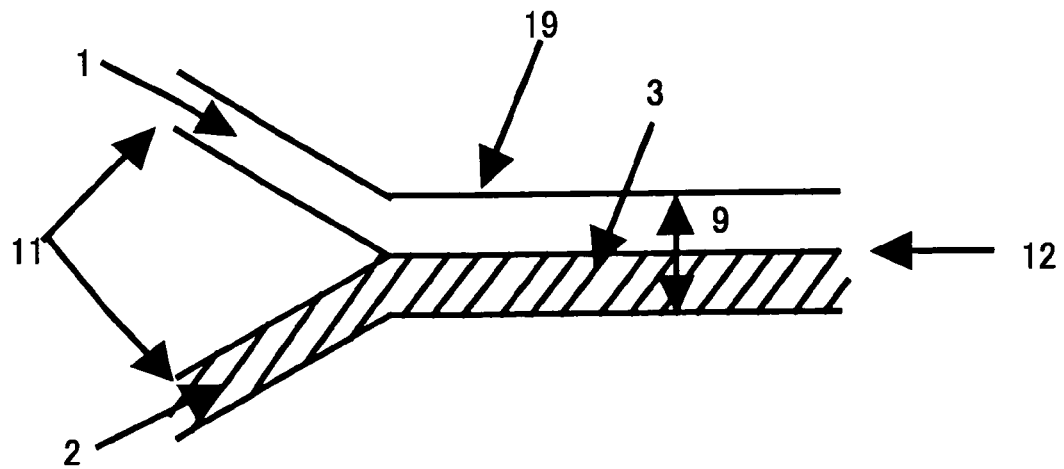
FIG. 1 is a diagram showing laminar flows in a Y-letter like fine channel.
Figure 2:
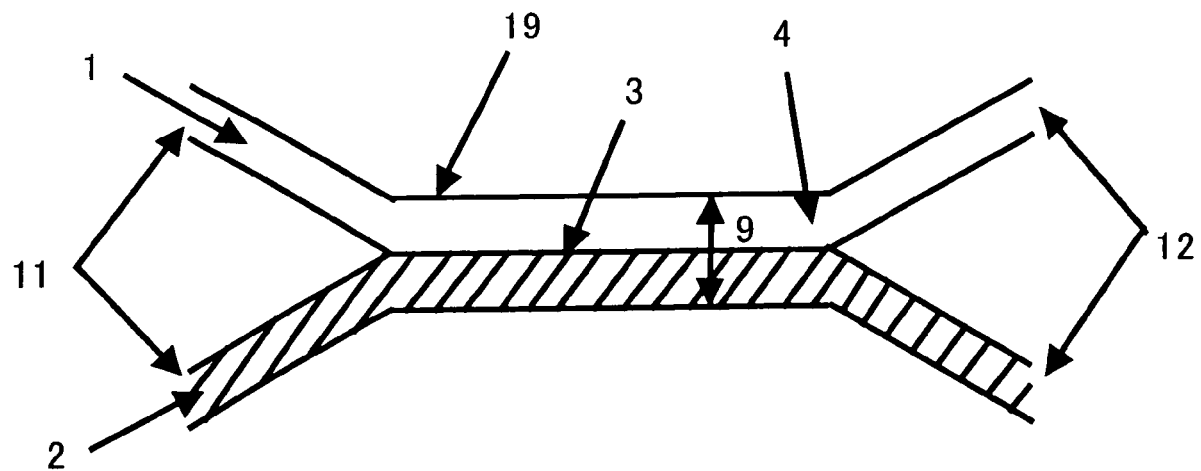
FIG. 2 is a diagram showing laminar flows in a double Y-letter like fine channel, which is referred to in Comparative Examples 2 and 3.
Figure 3A:
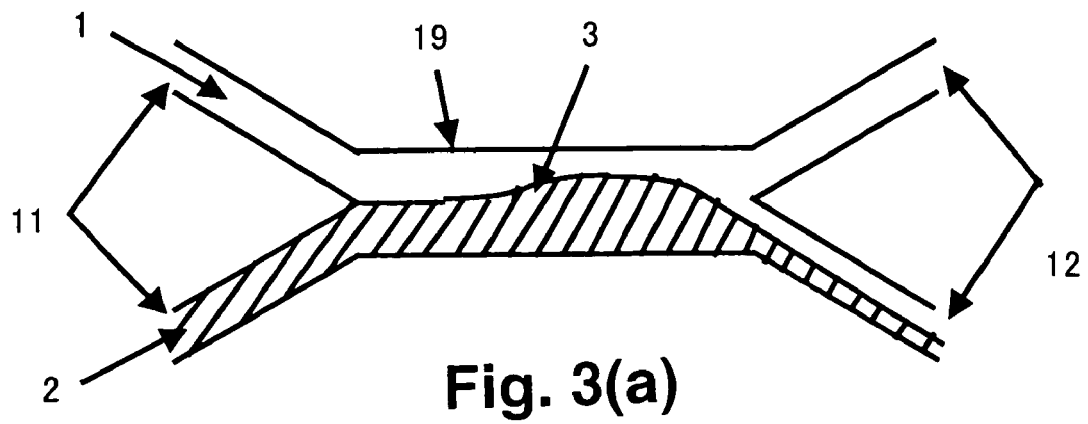
FIGS. 3(a), 3(b) and 3(c) are diagrams showing how the position of the fluid boundary varies.
Figure 3B:
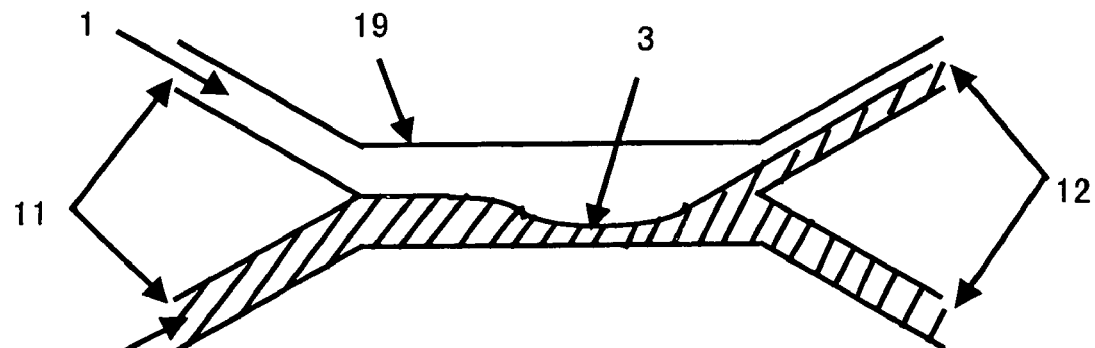
Figure 3C:
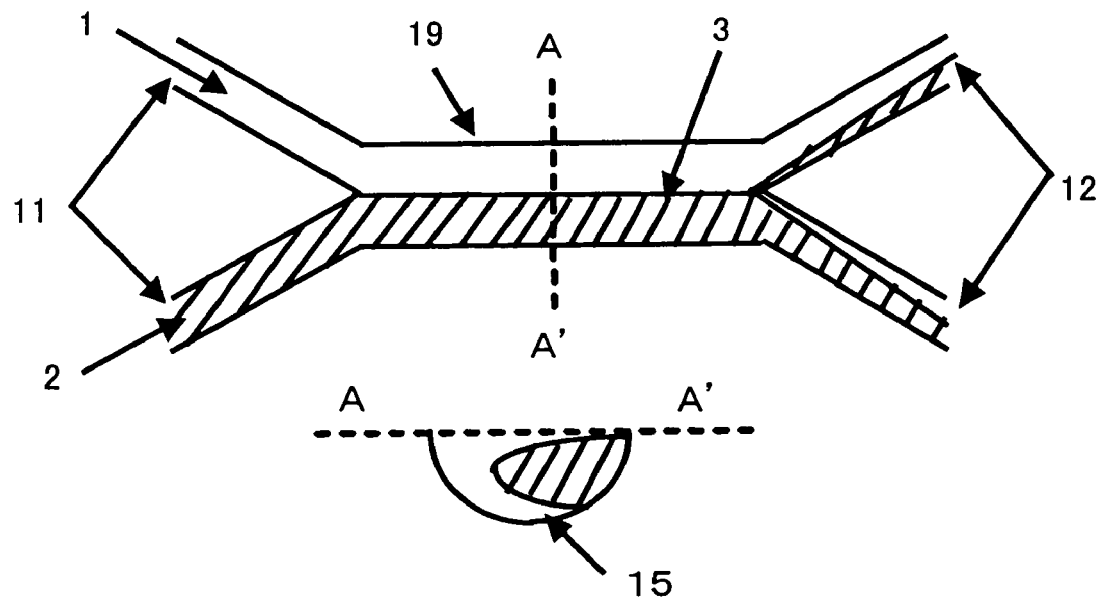
Figure 4A:
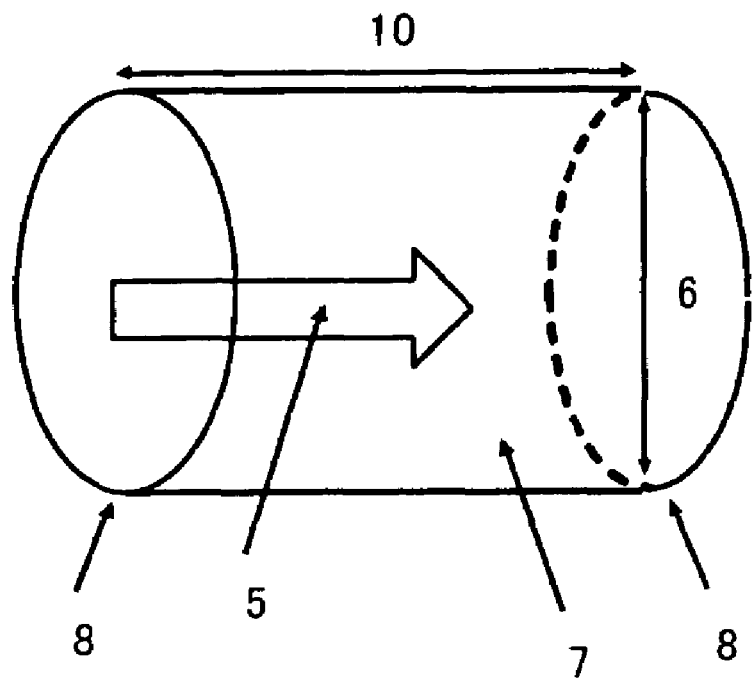
FIGS. 4(a) and 4(b) are diagrams for explaining Hagen-Poiseuille formula.
Figure 4B:
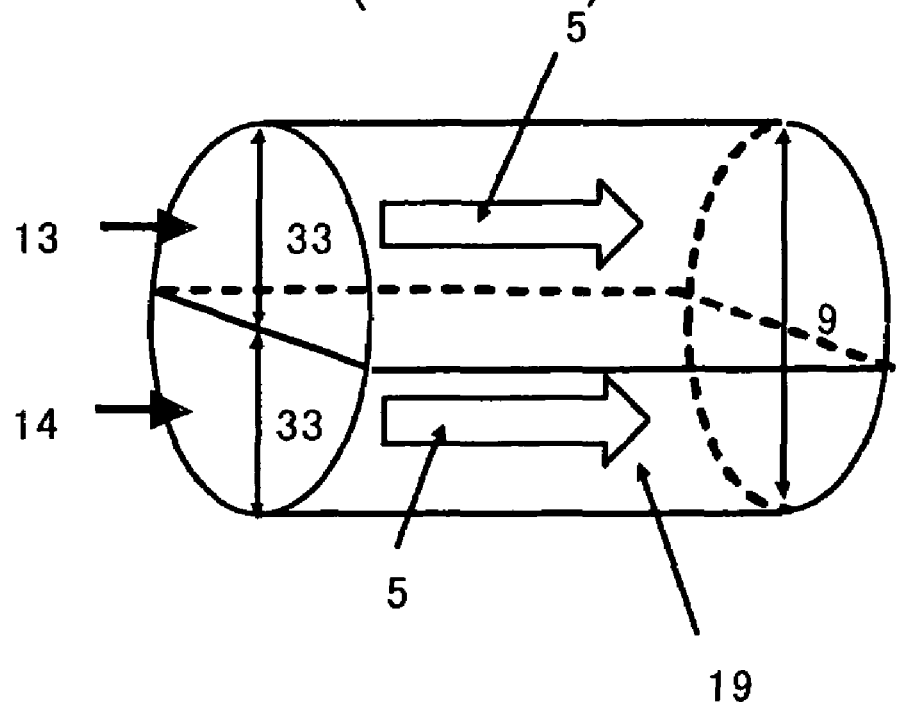
Figure 6A:
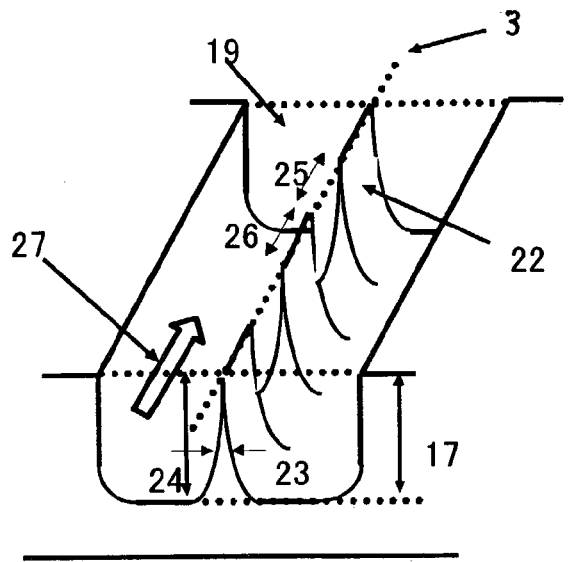
FIG. 6(a) is a diagram showing the inner structure of fine channel used for Examples 1, 2, 3, 5 and 6.

FIG. 6(a) shows an arrangement of partition walls as an embodiment of the present invention, based on the above-mentioned way of thinking. A plurality of partition walls 22 are formed with intervals in a flowing direction of fluid 27 in the fine channel 19 at or the vicinity of a fluid boundary 3 formed by at least two laminar flows of fluid. The height 24 of each partition walls is not more than the depth 17 of the fine channel. Accordingly, adjacent flows of fluid contact mutually at an absent portion of partition wall and they are separated from each other at a partition wall. Thus, by forming a plurality of partition walls with intervals in a flowing direction of fluid, the contact and separation of fluid are repeated. Accordingly, a positional variation of the fluid boundary due to a change of flow rate per time caused by a liquid supply pump can be minimized, and a wraparound phenomenon 15 in FIG. 3(c) due to a difference of affinity between the inner wall of the fine channel and the supplied fluid can be prevented, and each flow of fluid can be discharged through each outlet port of fine channel without causing the mixing of fluid. Accordingly, the mixing or a chemical reaction of fluid or solvent extraction by the diffusion of molecules between adjacent flows of fluid in mutually contact in the fine channel can be stopped completely at the fluid outlet ports. Further, it is possible to reuse again the fluid supplied once to the fine channel.

Positions of the partition walls with respect to a width direction of the fine channel are not in particular limited, and the positions may be changed depending on an amount of fluid to be supplied, the flow rate or the nature of such solution such as the viscosity thereof. It is considered that the position of the fluid boundary changes gradually in a flowing direction of fluid due to changes of viscosities of adjacent flows of fluid during operations of the mixing or a chemical reaction of fluid or solvent extraction. Even in this case, the change of viscosities can previously be estimated by using simulation or the like, and according to the simulation, partition walls can be formed according to the estimated position of fluid boundary. On the other hand, when partition walls are formed at or near the center with respect to a width direction of the fine channel, and when two kinds of fluid having different viscosities are supplied, the fluid boundary can be determined at or near the partition walls if these kinds of fluid are supplied flow rates in inverse proportion to the viscosities of fluid from Formula 7. Although the thickness 23 of the partition walls 22 is not in particular limited, it is preferable that it is about 3-10% of the width of the fine channel so as not to be an obstacle to fluid supply. The height 24 of each partition wall is not in particular limited as long as it is not more than the depth 17 of the fine channel. In the most preferable case, the height is the same as the depth 17 of the fine channel. Further, the shortest distance 25 of adjacent partition walls in a flowing direction of fluid is not in particular limited as far as partition walls 22 are formed with intervals. However, if the distance 25 is too small, a contact time of fluid becomes short whereby it is difficult to conduct a chemical reaction or solvent extraction sufficiently. Accordingly, the distance is preferably at least about 50 μm.

In the fine channel device of the present invention, when plural kinds of fluid are supplied to the fine channel at the same flow rate, the shortest distance between adjacent partition walls in a flowing direction of fluid is preferably less than 800 μm, more preferably, 400 μm or less.

If the shortest distance between adjacent partition walls is 800 μm as described in the below-mentioned Example, it is difficult to discharge each kind of fluid from an outlet port via an outlet channel without causing mutual contamination between adjacent flows of fluid. It is because if the shortest distance exceeds 800 μm, the position of the fluid boundary becomes unstable due to a change of the flow rate per time because of using a fluid supply pump or a difference of affinity between the inner wall of the fine channel and the supplied fluid which may cause a wraparound phenomenon of fluid. In Examples according to the present invention, each kind of fluid can be discharged from an outlet port via an outlet channel without causing the mutual contamination between adjacent flows of fluid when the shortest distance between adjacent partition walls in a flowing direction of fluid is 400 μm or less.

These conditions are determined on the assumption that viscosity coefficients of two kinds of fluid to be supplied are equal and the position of the partition walls with respect to a width direction of the fine channel is the center. However, when viscosity coefficients of two kinds of fluid to be fed adjacently are different, the value of $d_A$ or $d_B$ at the same flow rate should be calculated by using Formula 7 and Formula 8, and the position of partition walls can be determined according to similar relational formulas.

Further, in the fine channel device of the present invention, when products of a flow rate of a kind of fluid flowing adjacently in the fine channel and a viscosity coefficient are different, the shortest distance between adjacent partition walls in a flowing direction of fluid is preferably not more than 400 μm, more preferably, not more than 200 μm. By determining the shortest distance as described above, each kind of fluid can be discharged from a predetermined outlet port via an outlet channel without causing mutual contamination between adjacent flows of fluid even though the ratios of products of the flow rate of fluid and the viscosity coefficient vary in a range of from 0.625 to 1.25.

Namely, when viscosity coefficients of two kinds of fluid are the same, the flow rate of a kind of fluid having a relatively low affinity to the inner wall of the fine channel should be 10 μL/min, whereby each kind of fluid can be discharged from an outlet port via an outlet channel without causing mutual contamination between adjacent flows of fluid even though the flow rate of the other kinds of fluid having a relatively high affinity to the inner wall of the fine channel varies in a range of from 6.25 to 12.5 μL/min.

Or, when flow rates of two kinds of fluid are the same, and the viscosity coefficient of the fluid having a relatively low affinity to the inner wall of the fine channel is 1 mPa·s, each kind of fluid can be discharged from an outlet port via an outlet channel without causing mutual contamination between adjacent flows of fluid even when the viscosity of the fluid having a relatively high affinity to the inner wall of the fine channel varies in a range of from 0.625 to 1.25 mPa·s. These conditions are determined on the assumption that viscosity coefficients of two kinds of fluid are the same and the position of the partition walls with respect to a width direction of the fine channel is at the center. However, when viscosity coefficients of two kinds of fluid flowing adjacently are different, the value of $d_A$ or $d_B$ at the same flow rate should be calculated by using Formula 7 and Formula 8, and the position of the partition walls can be determined according to similar formulas.

As shown in FIG. 6(a), the maximum length 26 of each partition wall in a flowing direction of fluid in a straight portion of the fine channel of the present invention is preferably smaller than the minimum distance 25 between adjacent partition walls in a flowing direction of fluid. Namely, by determining the maximum length of each partition wall in a flowing direction of fluid to be smaller than the minimum distance between adjacent partition walls in a flowing direction of fluid, a contact time of fluid, i.e. a time of chemical reaction or a time of solvent extraction can be prolonged in consideration of the length of the fine channel. The maximum length of the partition wall in a flowing direction of fluid should be at least 50 μm whereby the fluid boundary can be formed stably and each kind of fluid can be separated at an outlet channel and discharged from an outlet port without causing mutual contamination between adjacent flows of fluid.

In FIG. 6(a), reference numeral 22 designates a projection.

Further, it is preferable that as shown in FIGS. 8(a) to 8(d), in the vicinity of inlet channels 38 and/or in the vicinity of outlet channels 39 in the fine channel 19, the minimum distance 25 between adjacent partition walls 22 in a flowing direction of fluid is smaller than the minimum distance between partition walls in a flowing direction of fluid in the vicinity of a central portion 40 of the fine channel. The vicinity of inlet channels 38 means a distance of 5,000 μm or less from a confluent portion 37, and the vicinity of outlet channels 39 means a distance of 5,000 μm or less from a branch portion 4. Thus, the fluid boundary 3 can be stable in the vicinity of inlet channels and/or in the vicinity of outlet channels whereby each kind of fluid can be separated at the confluent portion, and the branch portion, and discharged more certainly without causing mutual contamination between two adjacent flows of fluid.

In FIGS. 8(a) to 8(d), numeral 1 designates an aqueous phase, 2 an organic phase, 11 fluid inlet ports, 12 fluid outlet ports. 42 the vicinity of the confluent portion and 43 the vicinity of the branch portion.

The fine channel device of the present invention has a feature that the affinity of the inner wall of the fine channel at one side defined by the partition walls is different from the affinity of the inner wall at the other side defined by the partition walls. By providing such feature, it is possible to suppress effectively a wraparound phenomenon which is resulted by surrounding a kind of fluid having no affinity to the inner wall on another kind fluid having affinity to the inner wall. Thus, each kind of fluid can be separated respectively without causing mutual contamination between adjacent flows of fluid and discharged more certainly from respective outlet ports.

Further, the fine channel device of the present invention has a feature that a plurality of projections are formed at the inner wall of the fine channel partitioned by partition walls to such an extent capable of maintaining a steady flow of fluid. By providing such projections, flowing directions of two kinds of fluid flowing adjacently in the channel are disturbed by the impinge of fluid to the projections whereby a stirring effect can be expected. According to the fine channel having the above-mentioned structure, it is unnecessary to provide a power source and accessories for stirring in comparison with a known stirring technique utilizing mechanical vibrations caused by a piezoelectric element or the like. Since each flow of fluid is disturbed in the fine channel while the fluid boundary formed by adjacent flows of fluid can be maintained stably by partition walls arranged with intervals in a flowing direction of fluid, materials contained in each flow of fluid are dispersed quickly and uniformly in each flow. Accordingly, a sufficient chemical reaction and solvent extraction can be conducted quickly.

Further, since adjacent flows of fluid can maintain the fluid boundary stably by the presence of partition walls arranged with intervals, each flow of fluid can easily be separated at the branch portion of the fine channel.

FIGS. 12(a) to 12(d) show diagrammatically several embodiments of projections formed in the fine channel. In FIG. 12, a case that two kinds of fluid are supplied, is shown. However, the present invention is not restricted to these embodiments but a modification can be made optionally as far as the split of the present invention is maintained.

Figure 12A:
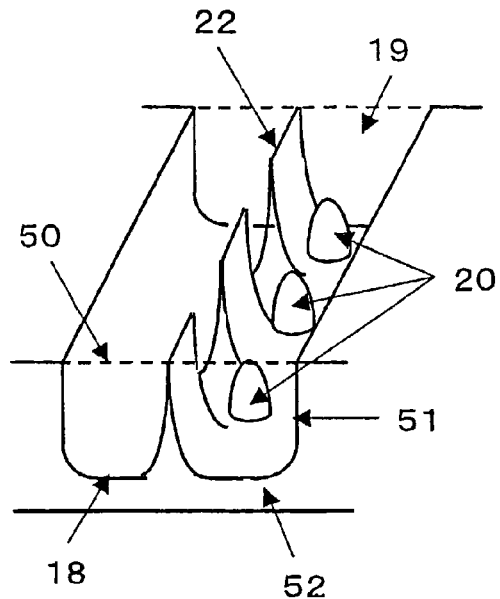
FIGS. 12(a) to 12(d) are diagrams showing several embodiments of projections formed in the fine channel of the present invention, the projections being to stir fluid while the fluid boundary is maintained.

FIG. 12(a) shows an embodiment that a plurality of projections 20 are formed in a bottom surface 18 at positions near the partition walls 22 in the fine channel 19. There is in particular no limitation concerning the projections as long as they are extended to an extent capable of stirring a kind of or plural kinds of fluid in each flow while the fluid boundary is maintained keeping smooth flows of fluid, and they have a height and a width so as not to block substantially the fine channel. There is no limitation of the number of projections as long as the projections do not block substantially the fine channel and the shape of each projections can be maintained. There is also no limitation about the way of arranging the projections, and they may be arranged regularly or randomly. In FIG. 12(a), the projections are formed in a bottom surface 18 at positions near the partition walls 22 in the fine channel 19. However, they may be formed in the entire bottom surface of the fine channel; they may be formed so as to project from an upper face 50 of the fine channel toward an inner side of the fine channel, or they may be formed to have both the above-mentioned arrangements. In a case that the projections are formed in a bottom surface of the fine channel and an upper face 50 of the fine channel, positions of projections may be the same or different at the bottom face and an upper face of the fine channel. In FIG. 12(a), numeral 51 designates a side face of the fine channel and numeral 52 designates a fine channel substrate.

Figure 12B:
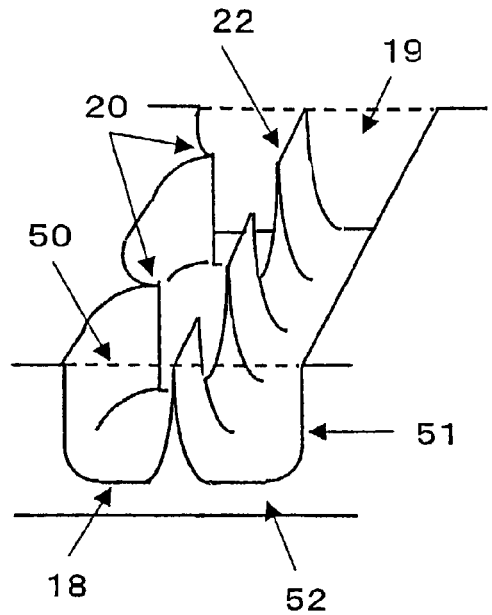

FIG. 12(b) shows an embodiment that a plurality of projections 20 are formed extending from a side face 51 at one side of the fine channel 19. There is in particular no limitation concerning the projections as long as they are extended to an extent capable of stirring a kind or plural kinds of fluid in each flow while the fluid boundary is maintained keeping a smooth flow of fluid, and they have a height and a width so as not to block substantially the fine channel 19. There is also no limitation of the number of projections as long as they do not block substantially the fine channel and the shape of each projection can be maintained. There is also no limitation of the way of arranging the projections, and they may be arranged regularly or randomly. In FIG. 12(b), projections are formed only in a side face 51 at one side of the fine channel. However, projections may be formed in side faces at both sides of the fine channel. In a case that projections are formed in side faces at both sides of the fine channel, positions of the projections may be the same or different at both the side faces as long as the projections do not block substantially the fine channel.

Figure 12C:
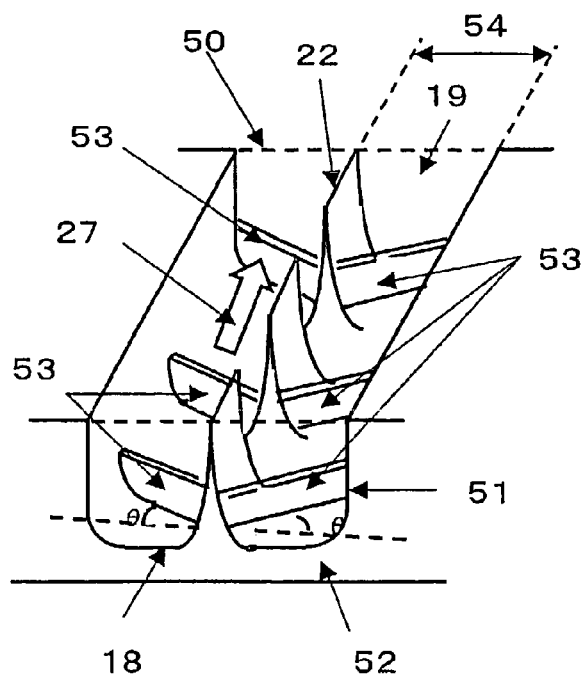
Figure 12D:
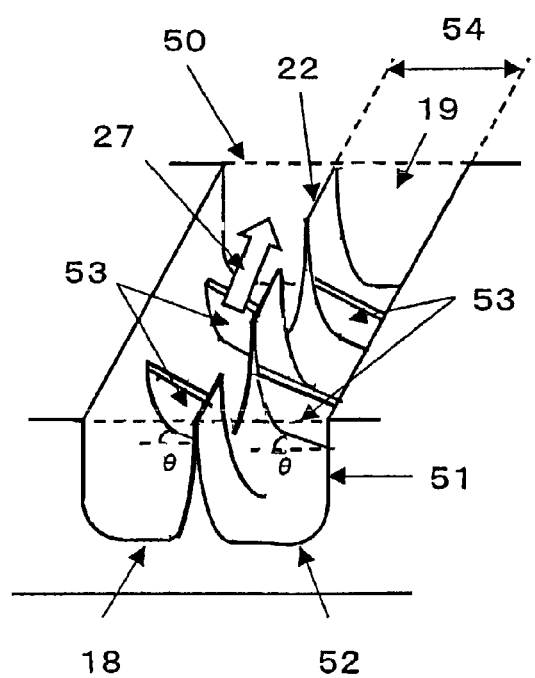

FIGS. 12(c) and 12(d) show embodiments that walls 53 having an angle θ with respect to a flowing direction of fluid 27 are formed extending vertically from the bottom surface 18 of the fine channel 19. The width of each wall 53 is determined to be the near same as the width 54 of the fluid boundary. There is in particular no limitation of the height of the walls unless they block substantially the fine channel 19. Further, there is no limitation of the number of the walls as long as they do not block substantially the fine channel and the shape of each wall can be maintained. Further, there is in particular no limitation as to how the walls are arranged, and they may be arranged regularly with same intervals or may be arranged to have random intervals. There is in particular no limitation of the angle θ of the walls with respect to a flowing direction of fluid. The walls may be formed symmetrically at an angle θ with respect to a flowing direction of two kinds of fluid as shown in FIG. 12(c), or they may be formed at the same angle θ with respect to the flowing direction of two kinds of fluid as shown in FIG. 12(d). FIGS. 12(c) and 12(d) show the embodiments that walls 53 are formed in the bottom surface 18 at both sides of the fine channel. However, the walls may be formed at the bottom surface only at one side of the fine channel; an upper face 50 of the fine channel; a side face 51 at one side of the fine channel, or side faces at both sides of the fine channel.

In a case that the walls are formed at the bottom surface, upper face and the side faces of the fine channel, positions of the walls may be the same or different unless the walls do not block substantially the fine channel.

The fine channel device of the present invention is provided with at least two inlet ports for feeding fluid, inlet channels communicated with the inlet ports, at least two outlet channels, and outlet ports communicated with the outlet channels so that the flowing direction of either one of two kinds of fluid fed in the fine channel is opposite to the flowing direction of the other of two kinds of fluid fed in the fine channel. Accordingly, as shown in FIG. 9, it is possible to feed the two kinds of fluid flowing adjacent to each other as laminar flows in mutually opposite direction in the fine channel having, for example, a length of about several mm. Further, when the affinity of the inner wall at one side of the fine channel partitioned by the partition walls is modified to have a different affinity for the inner wall of at the other side of the fine channel partitioned by the partition walls, two adjacent flows of fluid flowing as laminar flows in the fine channel having a length of about several cm can be fed in mutually opposite direction. Accordingly, it is possible to conduct experiments for verifying whether or not it is possible to change an equilibrium of chemical reaction or solvent extraction.

Further, in the fine channel device of the present invention, a film having fine pores a diameter of which is smaller than any distance between adjacent partition walls can easily be formed between adjacent partition walls in a flowing direction of fluid. The material for such film may be a polymeric material such as nylon, acryl or cellulose, or may be an inorganic material such as silicon oxide, titanium oxide, alumina or zirconia, or may be a combination of a polymeric material and an inorganic material.

With respect to the formation of a film in the fine channel, the before-mentioned non-patent document 2 describes a case of forming nylon at the fluid boundary in a fine channel. However, the length of the fine channel permitting the formation of the film is about 1 mm at the most. Accordingly, the length was insufficient in practical use. On the other hand, according to the fine channel device of the present invention, a large number of partition walls with intervals of 1 mm or less can be formed in a flowing direction of fluid in a fine channel having a length of from several cm to several tens cm. Then, a film made of, for example, a polymeric material such as nylon, acryl or cellulose can be formed certainly between all adjacent partition walls. This is a feature of the fine channel device of the present invention.

Accordingly, a film of polymeric material such as nylon, acryl or cellulose can be formed according to the known technique disclosed in the non-patent document 2. Thus, a polymeric film capable of selectively separating can be formed in a fine channel having a practically usable length. Further, the fine channel device having a fine channel of practically usable length of the present invention makes it possible to conduct experiments as disclosed in the non-patent document 3 wherein a biochemical reaction is carried out by immobilizing an enzyme on a polymeric film formed at the fluid boundary of the fine channel.

As described before, the material of such film may be an inorganic material such as silicon oxide, titanium oxide, alumina or zirconia. Such an inorganic film can be formed by a series of steps as shown in FIG. 10, for example. Namely, at a step (1), a fine channel device of a 2-inlet-2-outlet system having two inlet ports and two outlet ports, prepared according to the present invention, is heated to an appropriate temperature, a thermosetting resin 44 is supplied from an inlet port and an aqueous phase 1 is supplied from the other inlet port to form each laminar flow. A heating temperature is gradually increased by a heater 45 to cure the thermosetting resin. At a step (2), suspension 46 obtained by suspending an inorganic material such as silicon oxide, titanium oxide, alumina or zirconia in an aqueous solution of ammonia or sodium hydroxide by a so-called sol-gel method, which is heated to an appropriate temperature, is supplied from the inlet port into which the aqueous phase is previously supplied. At a step (3), an inorganic material is coated on the inner surface at one side of the fine channel. At a step (4), acid or alkali is supplied from the inlet port from which the suspension of inorganic material is supplied to cure the thermosetting resin, to the other side of the fine channel, and the cured resin is removed. At a step (5), a porous film 48, made of an inorganic material having a thickness of 1 μm-5 μm is formed in each space between adjacent partition walls. Such a thin porous film of inorganic material can be used to carry thereon a catalyst whereby a catalytic reaction can be realized between adjacent flows of fluid. This is a feature of the fine channel device of the present invention.

Further, in the fine channel device of the present invention, a metallic film 49 may be disposed in the entire inner surface of the fine channel and/or the wall surface of the partition walls as shown in FIG. 11(a), or a metallic film 49 is disposed in a part thereof as shown in FIGS. 11(b) and 11(c). The structure shown in FIG. 11(a) provides such advantages that the affinity of the inner wall of the fine channel can be changed; an electric current can be supplied to the metallic film by using a known power source or an eddy current is generated in the metal by electromagnetic induction to heat the metal to use it as a heater, whereby the fluid flowing in the fine channel contacts directly the metal to obtain an efficient reaction by heating. Further, when the metal is a metal such as tungsten, platinum, palladium or ruthenium, it can be utilized as a catalyst for synthesis or decomposition for ammonia.

In the embodiments shown in FIGS. 11(b) and 11(c), an electric field can be produced between metallic films disposed in the fine channel by applying a voltage having a potential across the metallic films. For example, when the depth of the fine channel shown in FIG. 11(c) is 10 μm and a voltage of 10 V is applied across electrodes, a field intensity of $1 \times 10^6$ V/m can be generated. The field intensity corresponds to a field intensity obtained by applying a high voltage of 10 kV across electrodes spaced with 10 mm. Namely, a strong electric field can easily be generated by using a power source comprising several dry cells in the fine channel, and such strong electric field can control the alignment of polarized molecules, and can increase selectivity of a chemical reaction.

The metallic film in the fine channel can be formed by a known technique such as sputtering, electrolytic plating, electroless plating, vapor deposition, CVD or the like. The thickness of the metallic film is not in particular limited. However, a thickness of several nm to several tens μm is preferred in consideration of the size of the fine channel.

The fine channel device of the present invention may have a circulating channel to feed fluid discharged from an outlet port to an inlet port. The circulating channel includes a channel for recovering a reaction product and a channel for waste fluid as the case requires. In this specification, a circulating channel, a channel for recovering a reaction product and a channel for waste fluid is generally called as an outlet channel.

The circulating channel serves to feed a raw material-containing fluid for a chemical reaction in the separated fluid, and the circulating channel is communicated with any one or all inlet ports through an outlet port. The fine channel device having such channel can separate effectively a reaction product produced in a chemical reaction; recover a raw material-containing fluid to use it again for a chemical reaction. Thus, an effective chemical reaction can be realized.

The circulating channel may be provided with a pump communicated thereto to feed fluid and a reservoir tank to store the supplied fluid temporarily, which is communicated with at least one inlet channel and at least one outlet channel. The fine channel device having such structure allows recovering and reuse of fluid in the fine channel substrate. This can provide a very compact device for chemical reaction.

Further, it is possible to feed effectively fluid in which a raw material for chemical reaction remains, to an inlet port after the chemical reaction. Further, it is possible to recovery a very expensive catalyst in particular, an asymmetric catalyst, a phase transfer catalyst, a biocatalyst (an enzyme) or the like, to use it again for a chemical reaction.

FIG. 13 shows several embodiments of fluid supply/recovering system.

Figure 13A:
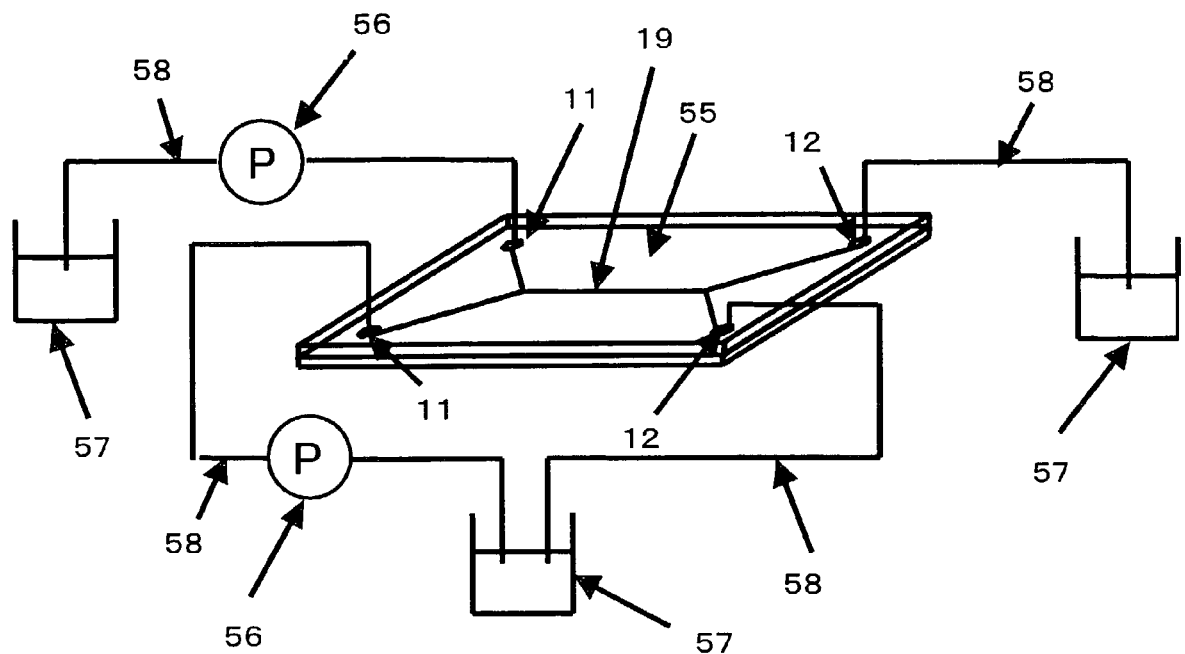
FIG. 13(a) is a diagram showing means for supplying fluid by a liquid supply pump located at the outside of the fine channel device and FIG. 13(b) is a diagram showing means for supplying fluid by a micropump embedded in the fine channel device.

FIG. 13(a) shows an embodiment of the system. Fluid is supplied to a fine channel device 55 by using a liquid supply pump 56 located outside the device. The fluid discharged from a fluid outlet port 12 can be returned to a container 57 in which fluid fed by the liquid supply pump is previously stored, through a capillary tube 58.

Figure 13B:
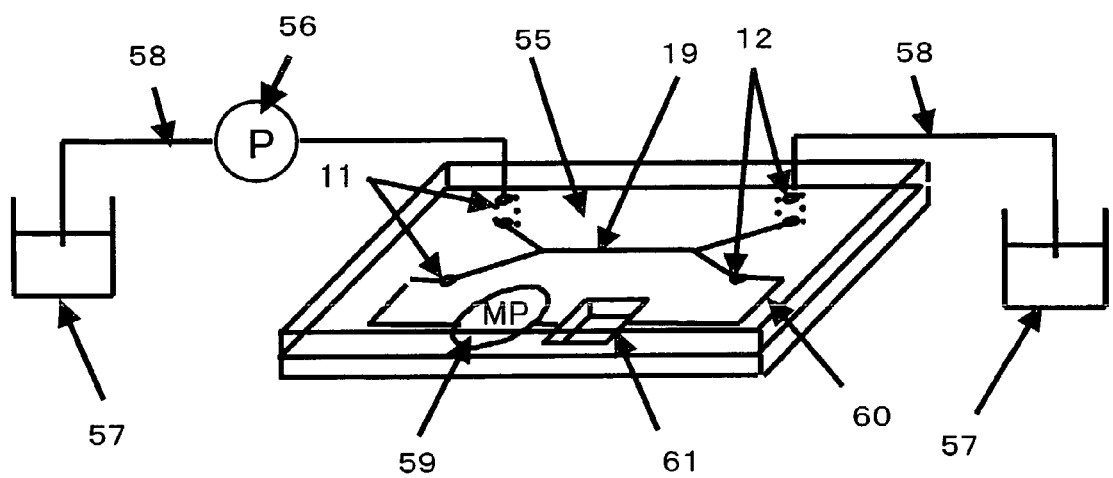

FIG. 13(b) shows another embodiment. A fine channel device 55 is provided with a reservoir tank 61 for storing fluid and an embedded micropump 59 for feeding fluid. Fluid is supplied to an fluid inlet port 11 from the reservoir tank by the action of the micropump, and the fluid discharged from a fluid outlet port 12 through a fine channel 19 can be returned again to the reservoir tank through a recovery channel 60 formed in the fine channel device, the returned fluid being circulated again by the micropump. In FIG. 13(b), characters Mp indicate the micropump 56. The capacity of the reservoir tank 61 is not in particular limited as long as it can keep a sufficient volume of fluid even when the fluid is circulated in the entire of the fine channel. Further, the width and the depth of the recovery channel are not in particular limited, but these may have the same width and depth of the fine channel.

Further, the fine channel device of the present invention may be provided with means for supplying energy to the fluid flowing in the fine channel. Specifically, said means for supplying energy is a heating device and/or a light irradiation device. Thus, the irradiation of light by the light irradiation device and/or the application of heat by the heating device supplies energy to a fine channel portion to thereby obtain an effective chemical reaction.

Further, the fine channel device of the present invention may comprise a single substrate in which a plurality of the above-mentioned fine channels having features as described above in an integrated form, or may be formed by piling-up a plurality of such substrate in one piece. By using such fine channel device, chemical operations such as mixing of a large amount of fluid, a chemical reaction, solvent extraction, separation or the like can be carried out by taking the advantage of a small space.

A fine channel substrate having a fine channel which is a structural element of the fine channel device can be prepared by processing directly a substrate such as glass, quartz, ceramics, silicon, metal or resin by mechanically processing, laser processing or etching. When the substrate is ceramics or resin, a substrate can be prepared by a molding technique with use of a metallic mold having a shape corresponding to a fine channel. Generally, a fine channel device comprises the above-mentioned fine channel substrate and a cover member having orifices of about several mm in diameter formed at positions corresponding to fluid inlet ports, and outlet ports of each fine channel, the substrate and the cover member being laminated integrally. Several methods for bonding the fine channel substrate and the cover member can be used depending on material used for the cover member and the substrate. Namely, when the substrate is ceramics or metal, soldering or an adhesive is preferably used. When the substrate is glass, quartz or resin, they should be bonded by applying a load at a high temperature such as 100° C. to a thousand and several hundreds ° C. When the substrate is silicon, it should be bonded to the cover member at the room temperature after the surface of the substrate is activated by cleaning.

The chemically operating method for fluid according to the present invention means chemical operations such as mixing or chemical reaction of fluid, solvent extraction, separation, recovery and so on by using the fine channel device of the present invention as described above, and it means also chemical operations in a combination of at least two in the above chemical operations.

As a mixing method, there is a chemically operating method wherein at least one kind of fluid containing fine particles is supplied to a fine channel, and the fine particle containing fluid is subjected to stirring while the fluid boundary is maintained to thereby accelerate mixing. In such chemical operating method, the fine particles in the fluid move therein to change the flowing direction of the fluid, and only the fine particle containing fluid is stirred. Accordingly, the stirring is carried out in each kind of fluid while the fluid boundary is maintained whereby a material contained in the fluid is rapidly dispersed uniformly in each fluid, and a sufficient chemical reaction and solvent extraction become possible.

Further, since adjacent laminar flows of fluid maintain the fluid boundary, each flow of fluid can easily be separated. Further, the width of fine channel is in a range of from several μm to several hundreds μm, and the depth is about several tens μm. Accordingly, the fine particles flowing in the fine channel does not cause clogging. Therefore, the particle size of the fine particles should be about one figure smaller than values of the width or the depth of the fine channel. Specifically, it is preferably in a range of from submicron to about several tens μm.

Further, the number of particles to be mixed is not in particular limited as long as a predetermined stirring effect can be given to the particle-containing fluid and the fine particles flowing in the fine channel does not cause clogging.

There is no particular restriction for a material for the fine particles as far as the material is incapable of dissolving in the fluid to which the fine particles are incorporated, the material being, for example, an inorganic material such as silica or a resin material such as polystyrene or polyacrylate. Further, for the material itself of fine particles, the surface of fine particles may be modified to have hydrophilic or hydrophobic properties. For example, it is preferred that in a case where the fluid to which the fine particles are incorporated, is a hydrophilic medium such as water, ethanol or the like, the fine particles modified so that the surface of the fine particles has a functional group such as a hydroxyl group or a carboxyl group to have hydrophilic properties, are used, and in a case where the fluid to which the fine particles are incorporated is a hydrophobic medium such as hexane, ethyl acetate or the like, the fine particles modified so that the surface of the fine particles has a functional group such as an octadecyl group or a butyl group to have hydrophobic properties, are used. Thus, it is possible to suppress the fine particles incorporated in a kind of fluid from moving acrossing the fluid boundary to another kind of fluid which flows adjacently with respect to the fluid boundary whereby the fine particle-containing fluid can be stirred while the fluid boundary can be kept stably by the presence of the partition walls arranged with intervals.

Figure 20:
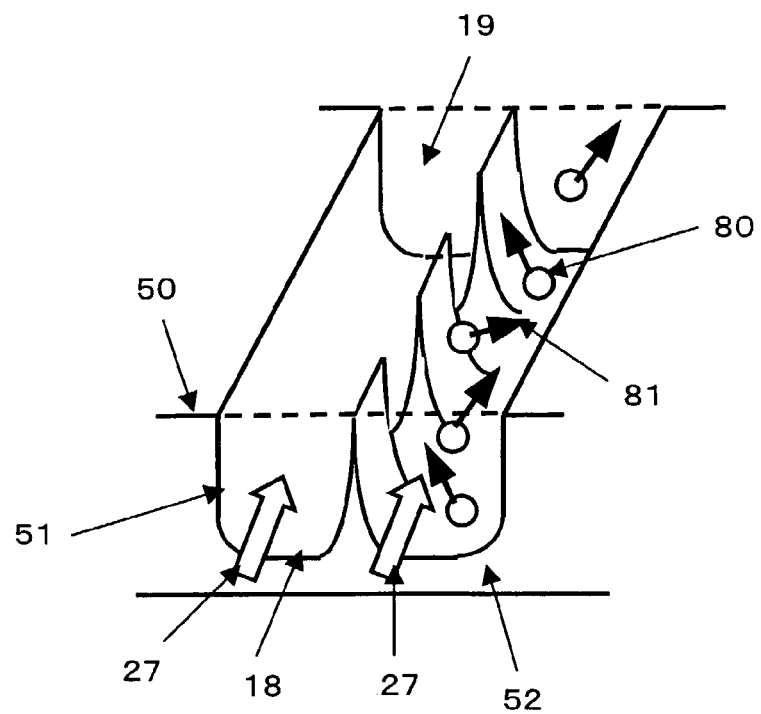
FIG. 20 is a diagram showing an example in which fine particles are mixed in fluid flowing in one side of the fine channel according to the present invention.

FIG. 20 is a diagram showing how the fluid is stirred by the function of the fine particles in the fine channel in a case that two kinds of fluid are supplied to the fine channel and fine particles are incorporated only in a kind of fluid. As shown in FIG. 20, fine particles 80 impinge on the inner wall of the fine channel 19 or collide with each other to change the moving direction 81 of the fine particles whereby a stirring effect is obtainable. Other than the case as shown in FIG. 20, the fine particles may be incorporated into two kinds of fluid to stir these kinds of fluid.

In FIG. 20, numeral 18 designates a bottom surface of the fine channel, 27 a flowing direction of fluid, 51 a side face of the fine channel and 52 a fine channel substrate.

Conventionally, chemical operations such as mixing, chemical reaction, solvent extraction, separation, catalyst recovery or the like were conducted separately using beakers, flasks etc. On the other hand, the fine channel device of the present invention allows chemical operations such as mixing, chemical reaction, solvent extraction, separation, recovery etc. all together in the fine channel. In particular, as a chemical reaction to which the chemically operating method using the fine channel device according to the present invention, there is a multiphase type catalytic reaction.

As a catalyst generally used, there are an acid-base catalyst such as oxonium ions, hydroxide ions or the like, and a transition metal complex having nickel palladium, copper titanium etc. as the central metal. Further, as a kind of catalyst, there is an enzyme being a protein produced in a living organism, which is a so-called biocatalyst such as lipase, trypsin, chymotrypsin, cathepsin, fumarate hydratase, laccase etc.

In the chemically operating method of the present invention, the fluid discharged from an outlet port and returned again to an inlet port may be the before-mentioned catalyst-containing fluid. By circulating the fluid, it is possible to recover a very expensive catalyst in a degree that the catalytic activity does not lost, and reuse the recovered catalyst. In a chemical reaction using an enzyme being a biocatalyst, an aqueous phase containing an enzyme and an organic phase containing a substrate are mixed with a stirring device such as a stirrer to produce suspension whereby the enzyme reacts effectively with the substrate. However, the enzyme is generally apt to lose its activity due to a physical action such as mechanically stirring or apt to lose due to the enzyme being suspended in the organic phase. On the other hand, the chemical reaction between the enzyme and the substrate can effectively be performed by using the fine channel device of the present invention because the interfacial surface area of the fine channel is large and the molecule diffusion distance is short by making the enzyme-containing aqueous phase and the substrate-containing organic phase flowing in the fine channel as laminar flows, contact mutually at the fluid boundary so that the enzyme contacts with the substrate without any mechanically stirring operation. Further, since the activity of the enzyme does not lose because of no physical action such as mechanically stirring or no suspension of the enzyme and the organic phase, the enzyme can easily be separated and recovered for reuse without losing its activity. Specifically, the enzyme-containing aqueous phase and the substrate-containing organic phase are separated in the fine channel; the organic phase is fed to an outlet channel to take out the substrate subjected to a catalytic reaction; the aqueous phase is fed to the outlet channel to take out the aqueous phase discharged from the outlet port, and the aqueous phase is again supplied to the inlet port to which the enzyme-containing aqueous phase has been supplied. Such chemically operating method can be accomplished only by using the fine channel device of the present invention.

In the chemically operating method according to the present invention, as shown in FIG. 19($a$), chemical operations such as mixing by diffusion, chemical reaction, solvent extraction, separation or recovery may be carried out by forming laminar flows of two phases of fluid comprising a catalyst-containing fluid 78 and a substrate-containing fluid 79 in a fine channel 19, or such chemical operations may be carried out by forming laminar flows of three phase of fluid: a catalyst-containing fluid 78 and two kinds of substrate-containing fluid 79 which are supplied to both sides of the catalyst-containing fluid 78 in a flowing direction as shown in FIG. 19($b$); such chemical operations may be carried out by forming laminar flows of three phases of fluid comprising a substrate-containing fluid 79 and two laminar flows of catalyst-containing fluid 78 which are supplied to flow both sides of the substrate-containing fluid 79 in a flowing direction as shown in FIG. 19($c$), or such chemical operations may be conducted by forming laminar flows of multi-phases of fluid comprising a plurality of laminar flows of catalyst-containing fluid 78 and a plurality of laminar flows of substrate-containing fluid 78 which are supplied in an alternately contacting state in a flowing direction 27 as shown in FIG. 19($d$). Here, a plurality of same or different kinds of substrates and a plurality of same or different kinds of catalysts may be used.

Figure 14:
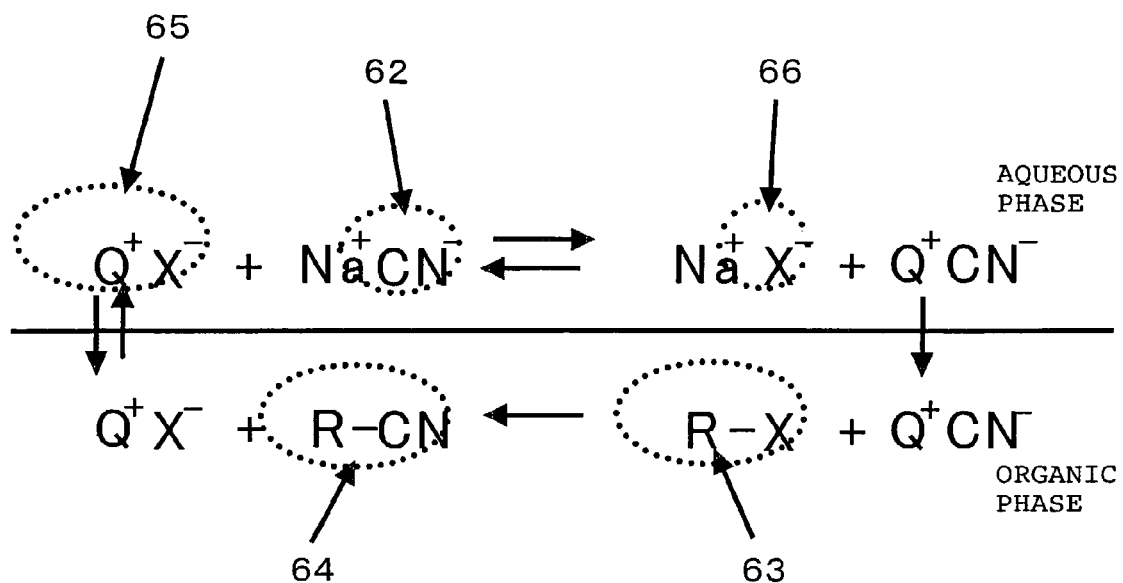
FIG. 14 is a diagram showing an example of reaction system using a phase transfer catalyst.

There is a so-called a phase transfer catalyst as one of an extensive group of catalyst. Description will be made as to a two-phase reaction system using a quaternary ammonium salt as an example of the phase transfer catalyst. FIG. 14 shows a concept of the mechanism of a reaction in which $CN^-$ is used as a nucleophilic anion 62, and (R—X) as an alkyl halide 63 is exchanged for (R—CN) as a nitrile 64 wherein $(Q^+X^-)$ as a quaternary ammonium salt 65 is used as a phase transfer catalyst.

In a reaction system constituted of an aqueous phase containing $Na^+CN^-$ composed of a nucleophilic anion and a non-polar organic phase containing (R—X) as an alkyl halide which is an organic substrate to react thereto, $(Q^+X^-)$ as a quaternary ammonium salt being a phase transfer catalyst transfers $(CN^-)$ as a nucleophilic anion to the organic phase where the reaction takes place by exchanging $(X^-)$ as a halogen anion 66 which constitutes its ion pair, for $(CN^-)$ as a nucleophilic anion in the aqueous phase, whereby the reaction is accelerated. After the reaction, the ion pair is formed with ($X^-$) as the released halogen anion and ($Q^+X^-$) as a quaternary ammonium salt is formed again and then, returns to the aqueous phase, and thus, such a cycle is repeated.

As the phase transfer catalyst, a phosphonium salt, a cinchoninium salt, a crown ether, cryptand, a dialkyl polyoxyethylene oxide etc. are generally known other than the quaternary ammonium salt.

The efficiency of the reaction in the reaction system using such phase transfer catalyst depends on how the phase transfer catalyst is transferred efficiently to another phase. The efficiency of phase transfer of the phase transfer catalyst is increased as the interfacial surface area between a catalyst phase and a reaction phase is larger and/or the diffusion distance of the phase transfer catalyst is shorter. In a fine space in the fine channel device of the present invention, however, since the interfacial surface area is large and the diffusion distance of molecules is short without a special stirring operation, the phase transfer of the phase transfer catalyst from the catalyst phase to the reaction phase or from the reaction phase to the catalyst phase can effectively be conducted.

In the fine channel in the fine channel device of the present invention, the catalyst phase and the reaction phase flow as laminar flows to keep the fluid boundary therebetween. At the branch portion of the fine channel to branch it into two outlet channels, the reaction phase and the catalyst phase which are in mutual contact are separated. The reaction phase is fed to an outlet channel to take out a product, and the catalyst phase is introduced to the other outlet channel. The catalyst phase discharged from the outlet port is again fed to the inlet port for supplying the catalyst phase. Thus, the phase transfer catalyst in the catalyst phase can easily be separated and recovered for reuse.

The phase transfer catalyst may be an energy dependence phase transfer catalyst. Energy means light or heat. Here, a catalyst causing phase transfer by applying such energy means the energy dependence phase transfer catalyst. When the applicable energy is heat, such energy dependence phase transfer catalyst is called particularly as a temperature dependence phase transfer catalyst.

Figure 15:
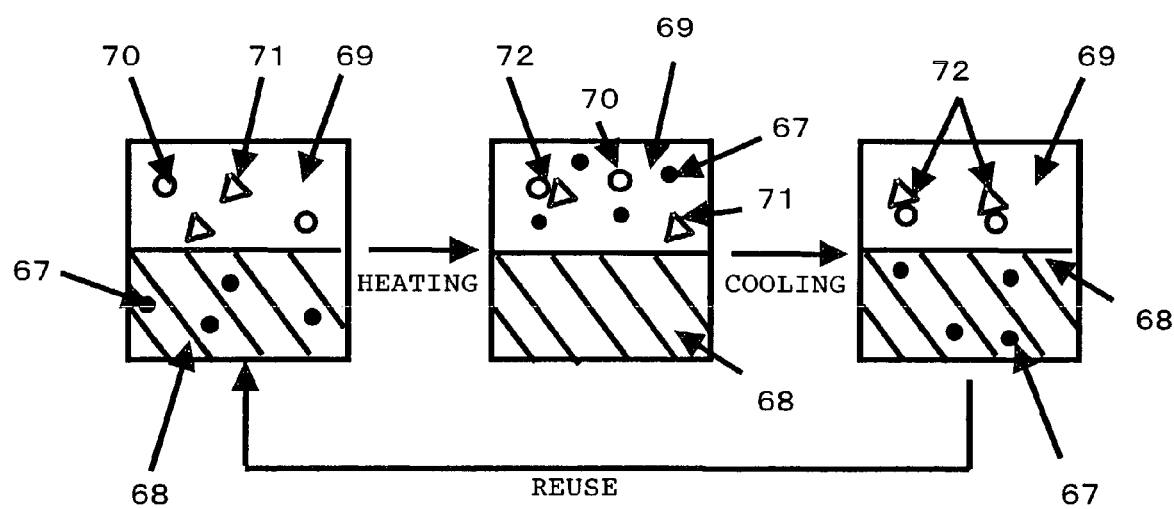
FIG. 15 is a diagram showing a concept of reaction system using a temperature dependence phase transfer catalyst.

The concept of the reaction system using the temperature dependence phase transfer catalyst will be described with reference to FIG. 15. As shown in FIG. 15, a catalyst D 67 in a catalyst phase 68 dissolves in a reaction phase 69 according to temperature rise whereby the reaction between a reaction product A 70 and a reaction product B 71 is accelerated to produce a product C 72. The solubility of the catalyst D to the reaction phase decreases according to temperature fall whereby the catalyst D returns to the catalyst phase and it does not contribute the reaction. Such catalyst D is generally called as the temperature dependence phase transfer catalyst. As an example of the reaction using such temperature dependence catalyst, Gladysz reaction or Yamamoto reaction as shown in FIG. 16 are well known.

The efficiency of the reaction system using such temperature dependence phase transfer catalyst depends on how the temperature dependence phase transfer catalyst is transferred efficiently to another phase. Namely, the efficiency of phase transfer of the temperature dependence phase transfer catalyst becomes better as the efficiency of heating/cooling is better or the interfacial surface area between the catalyst phase and the reaction phase is larger, or the diffusion distance of the temperature dependence phase transfer catalyst is shorter. In a fine space in the fine channel device of the present invention, however, since the heat capacity is small and rapid heating or cooling is possible, the phase transfer of the temperature dependence phase transfer catalyst from the catalyst phase to the reaction phase or from the reaction phase to the catalyst phase can effectively be carried out. Further, as described before, since the interfacial surface area is large and the diffusion distance of molecules is short in the fine space without a special stirring operation, the phase transfer of the temperature dependence phase transfer catalyst from the catalyst phase to the reaction phase or from the reaction phase to the catalyst phase can effectively be conducted.

Further, in the fine channel of the fine channel device according to the present invention, the catalyst phase and the reaction phase flow as laminar flows to keep the fluid boundary therebetween. At the branch portion of the fine channel to branch it into two outlet channels, the catalyst phase and the reaction phase which flow as adjacent laminar flows are separated. The reaction phase is introduced into a discharge channel to take out a product, and the catalyst phase is introduced into the other outlet channel. The catalyst phase discharged from the outlet port is again introduced into the inlet port for supplying the catalyst phase whereby the temperature dependency phase transfer catalyst in the catalyst phase can easily be separated and recovered for reuse.

Figure 17:
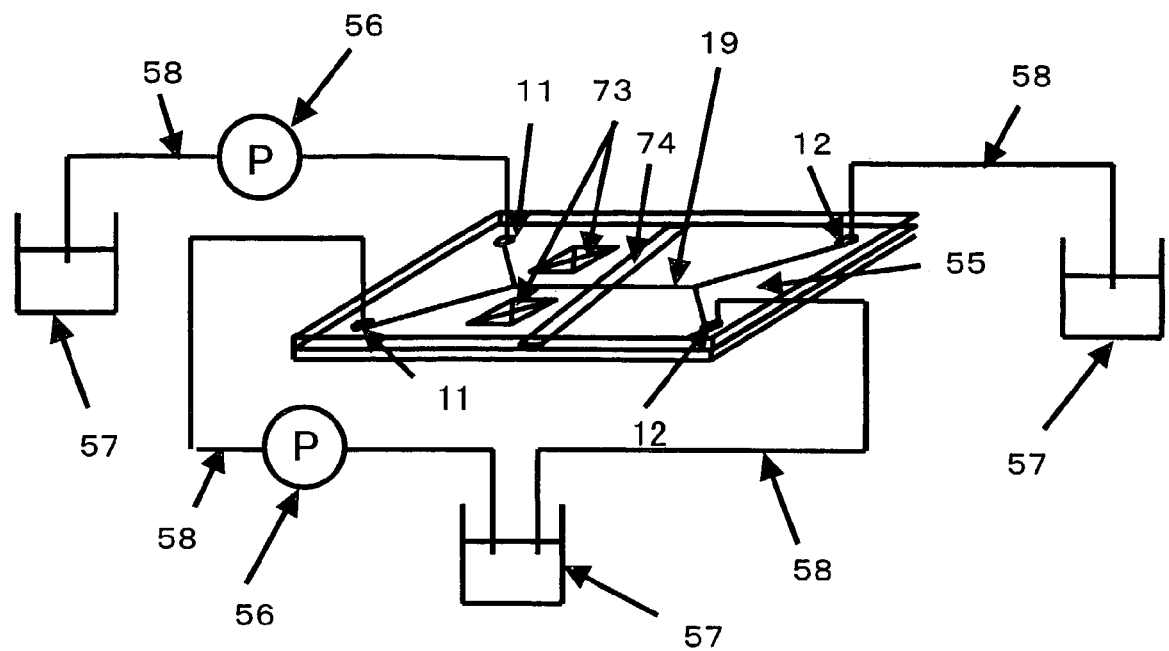
FIG. 17 is a diagram showing a concept of the fine channel device used for the temperature dependence phase transfer catalyst.

FIG. 17 shows a reaction system using the temperature dependence phase transfer catalyst in the fine channel device of the present invention. Heaters 73 as heating devices are disposed at an upstream side, e.g., near the inlet ports 11, of the fine channel 19 to heat the supplied fluid whereby the temperature dependence phase transfer catalyst is transferred efficiently from the catalyst phase to the reaction phase at the upstream side of the fine channel 19 to cause a reaction. A heat insulation material 74 is embedded in the fine channel device 55, according to a known heat insulation technique, at a downstream side, e.g., near the outlet ports 12, to isolate heat in the upstream side of the fine channel from the downstream side whereby the temperature of the supplied fluid returned to the room temperature. Thus, the temperature dependence phase transfer catalyst can effectively be transferred to the catalyst phase whereby the catalyst can be separated and recovered for reuse.

Figure 18:
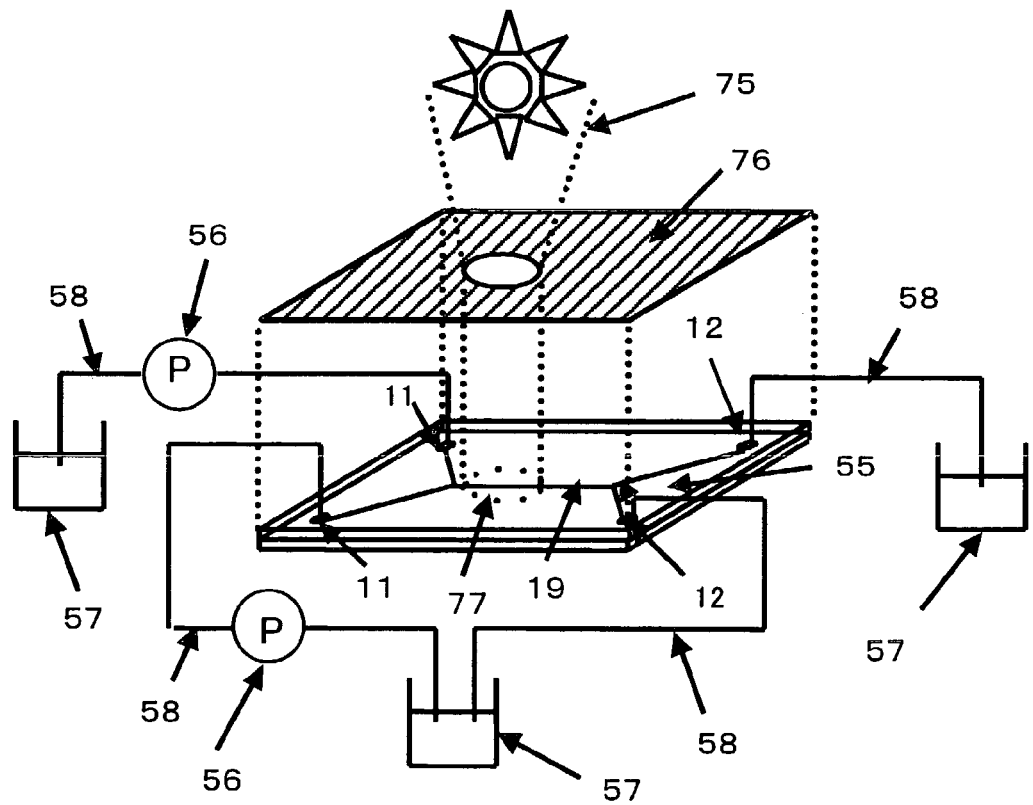
FIG. 18 is a diagram showing the fine channel device adapted to irradiate light to a portion of the fine channel formed in the fine channel device to supply energy thereto.
Figure 19A:
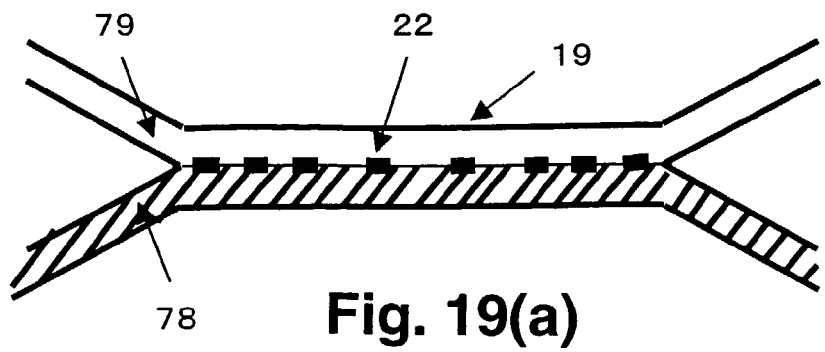
FIGS. 19(a) to 19(d) are diagrams showing several examples for chemical operations by forming laminar flows of fluid containing a catalyst and fluid containing a substrate in a fine channel formed in the fine channel device of the present invention.
Figure 19B:
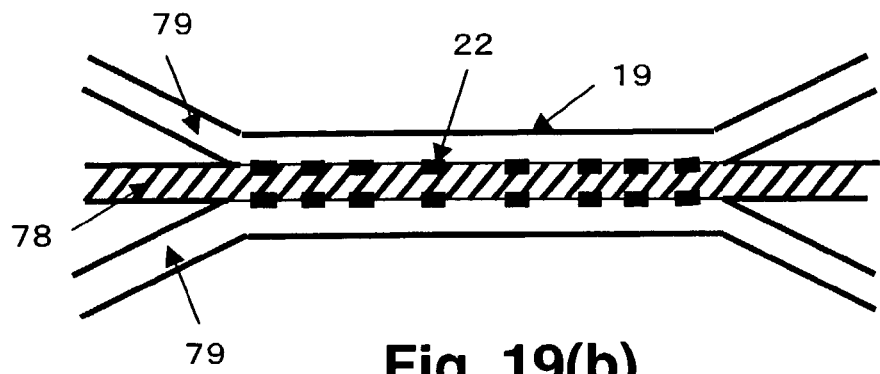
Figure 19C:
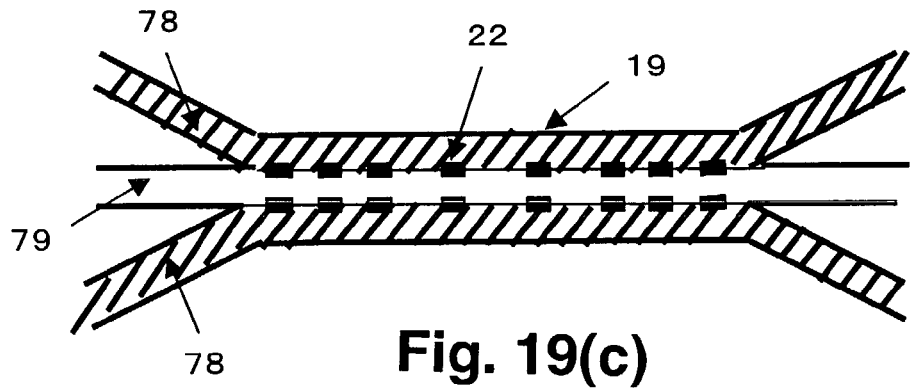
Figure 19D:
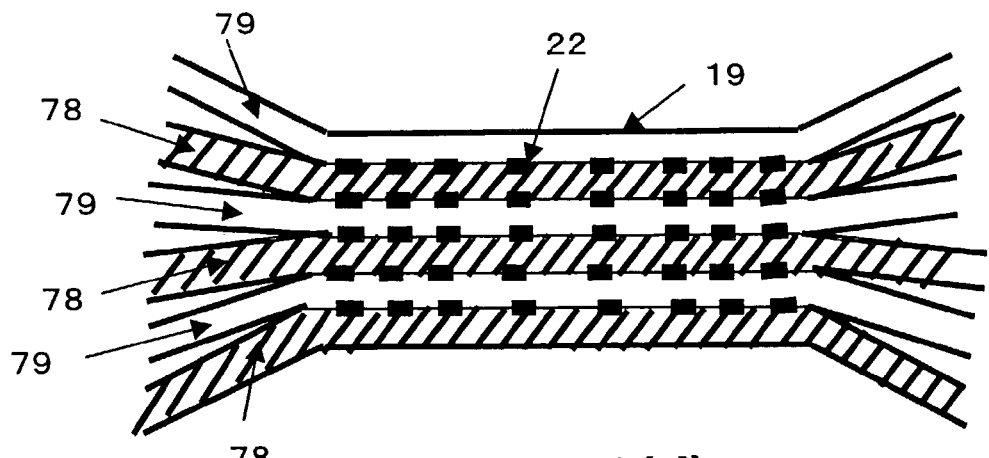

FIG. 18 shows an embodiment of the fine channel device in a case that energy applicable to the energy dependence phase transfer catalyst is light wherein the fine channel device is provided with a light irradiation device for irradiating light to a part of the channel. FIG. 18 shows the structure of the fine channel device 19 wherein a light spot 77 is formed at a portion of the fine channel 19 by irradiating light 75 through a mask 76. Other reference numerals in FIGS. 17 and 18 are the same as those indicated in FIG. 13.

EXAMPLES

Now, the present invention will be described in detail with reference to Examples. However, it should be understood that the present invention is by no means restricted to such specific Examples.

Example 1

In Example 1, 5 fine channel devices each having the construction as shown in FIG. 6(*b*) were prepared. A fine channel 19 formed in each fine channel device was branched into two fine channel portions in a Y-letter like form at each side of fluid inlet and outlet ports. The inner structure of the fine channel of the fine channel device was such that, as shown in FIG. 6(*a*), partition walls 22 having the substantially same height as the depth of the fine channel were formed intermittently along a flowing direction of fluid 17 at a substantially central portion with respect to a width direction of the fine channel. The width 9 of each fine channel was 100 μm, the depth 17 was 20 μm and the length was 30 mm. 5 Kinds of fine channel in which the minimum distance 25 between adjacent partition walls in a flowing direction of fluid and the maximum length 26 of each partition wall in a flowing direction were respectively 50 μm, 100 μm, 200 μm, 400 μm and 800 μm were formed in the 5 fine channel devices. The thickness 23 of each partition wall in a width direction was about 5 μm.

As shown in FIG. 6(*b*), each fine channel was formed in each Pyrex (trademark) glass substrate 32 having a size of 70 mm×38 mm×1 mm (thick) according to conventional photolithographic and wet etching techniques, and each cover member 34 comprising a Pyrex (trademark) glass substrate having the same size as the fine channel substrate in which penetration holes 35 having a diameter of 0.6 mm were formed mechanically at positions corresponding to inlet ports A 28, B 29 and outlet ports C 30, D 31, was prepared. Each cover member was thermally bonded on each fine channel substrate to seal hermetically the fine channel.

Water and cyclohexane were supplied respectively into each of the fine channel devices at the same flow rate in a range of from 3 μL/min to 50 μL/min. Here, the viscosity of water at 20° C. was 1.002 [mPa·s] and the viscosity of cyclohexane was 0.979 [mPa·s] at the same temperature, which were substantially the same as the water. Water was supplied from an inlet port A 28 and cyclohexane was supplied from an inlet port B 29 under the above-mentioned flow rate condition, and an amount of cyclohexane in which an amount of water was contaminated discharged from an outlet port C 30 and an amount of water in which an amount of cyclohexane was contaminated discharged from an outlet port D 31 were measured respectively by a graduated cylinder respectively. Table 1 shows a result.

TABLE 1

| Flow rate (μL/min) Distance between adjacent partition walls (μm) | 3 | 5 | 8 | 10 | 20 | 50 |
|---|---|---|---|---|---|---|
| Contamination percentage of organic phase to aqueous phase (%) | | | | | | |
| 50 | 3.3 | 3.4 | 1.2 | 3.0 | 4.3 | 0.0 |
| 100 | 5.3 | 0.0 | 0.0 | 0.0 | 0.0 | 0.0 |
| 200 | 0.0 | 0.0 | 0.0 | 0.0 | 0.0 | 4.8 |
| 400 | 41.7 | 27.6 | 0.0 | 0.0 | 0.0 | 0.0 |
| 800 | 35.8 | 28.7 | 12.4 | 9.5 | 18.1 | 41.7 |
| Comparative Example | — | 55.0 | 47.5 | 38.6 | 49.1 | — |
| Contamination percentage of aqueous phase to organic phase (%) | | | | | | |
| 50 | 0.0 | 0.0 | 0.0 | 0.4 | 0.0 | 5.1 |
| 100 | 2.2 | 3.5 | 1.4 | 0.0 | 0.0 | 0.0 |
| 200 | 3.4 | 6.9 | 9.6 | 2.0 | 2.4 | 1.1 |
| 400 | 33.6 | 14.3 | 3.1 | 3.7 | 0.0 | 9.1 |
| 800 | 32.3 | 29.9 | 7.3 | 12.0 | 55.4 | 39.1 |
| Comparative Example | — | 38.9 | 34.3 | 42.0 | 67.8 | — |

Table 1 shows contamination percentages of fluid: a contamination percentage (%) of an organic phase to an aqueous phase and a contamination percentage (%) of an aqueous phase to an organic phase, at flow rates of 3, 5, 8, 10, 20 and 50 μL/min when both the aqueous phase and the organic phase are supplied under the same flow rate condition. Minimum distances between adjacent partition walls in a flowing direction of fluid are determined to be 50, 100, 200, 400 and 800 μm respectively.

As understood from the result in Example 1, when the minimum distance between adjacent partition walls in a flowing direction of fluid was 400 μm or less, a contamination percentage of less than 10% could be achieved at a flow rate in a range of from 8 to 50 μL/min. When the minimum distance between adjacent partition walls in a flowing direction of fluid was 800 μm, a contamination percentage of less than 10% could not be achieved even at any flow rate.

Example 2

In Example 2, fine channel devices, as shown in FIG. 6, used in Example 1 were used. Cyclohexane was supplied at a fixed flow rate of 8 μL/min, and water was supplied by changing the flow rate in a range of from 3 μL/min to 20 μL/min. Namely, water was supplied from the inlet port A 28 and cyclohexane was supplied from the inlet port B 29 under the above-mentioned flow rate condition so that a ratio of the flow rate of water to that of cyclohexane is in a range of from 0.375 to 2.5, and an amount of cyclohexane in which an amount of water was contaminated discharged from the outlet port C 30 and an amount of water in which an amount of cyclohexane was contaminated discharged from the outlet port D 31 were measured by a graduated cylinder respectively. Table 2 shows a result.

TABLE 2

| Flow rate ratio Distance between adjacent partition walls (μm) | 0.375 | 0.625 | 1.000 | 1.250 | 2.500 |
|---|---|---|---|---|---|
| Contamination percentage of organic phase to aqueous phase (%) | | | | | |
| 50 | 11.0 | 9.5 | 1.7 | 0.0 | 23.8 |
| 100 | 15.0 | 3.5 | 0.0 | 0.0 | 4.2 |
| 200 | 1.7 | 2.7 | 0.0 | 5.4 | 4.2 |
| 400 | 69.0 | 56.1 | 0.0 | 35.9 | 56.3 |
| 800 | 67.4 | 45.8 | 12.4 | 32.5 | 20.5 |
| Comparative Example | 77.3 | 33.3 | 46.3 | 38.6 | 46.3 |
| Contamination percentage of aqueous phase to organic phase (%) | | | | | |
| 50 | 2.3 | 0.0 | 1.7 | 2.8 | 64.3 |
| 100 | 4.8 | 1.4 | 1.4 | 7.3 | 26.3 |
| 200 | 0.5 | 0.7 | 9.6 | 8.7 | 54.3 |
| 400 | 21.3 | 29.9 | 3.1 | 59.2 | 26.3 |
| 800 | 15.8 | 30.5 | 7.3 | 45.3 | 72.6 |
| Comparative Example | 23.6 | 24.5 | 33.9 | 41.9 | 32.2 |

Table 2 shows contamination percentages of fluid: a contamination percentage (%) of an organic phase to an aqueous phase and a contamination percentage (%) of an aqueous phase to an organic phase, at flow rate ratios of 0.375, 0.625, 1.000, 1.250 and 2.500 respectively. Minimum distance between adjacent partition walls in a flowing direction of fluid are determined to be 50, 100, 200, 400 and 800 μm respectively.

As understood from the result in Example 2, when the minimum distance between adjacent partition walls in a flowing direction of fluid was 200 μm or less, a contamination percentage of less than 10% could be achieved at a flow rate ratio in a range of from 0.625 to 1.25. When minimum distances between adjacent partition walls in a flowing direction of fluid were 400 μm and 800 μm, a contamination percentage of less than 10% could not be achieved in cases except that the ratio of flow rate was 1:1.

Comparative Example 1

Figure 5A:
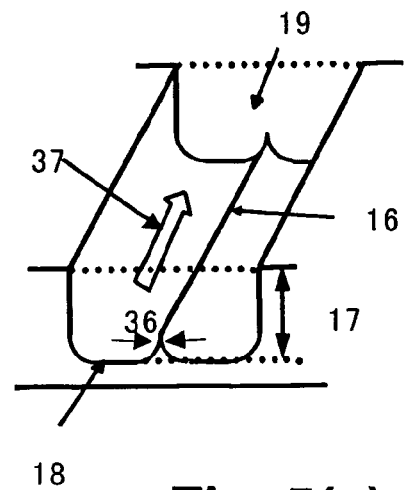
FIG. 5(a) is a diagram showing the inner structure of fine channel used in Comparative Example 1 and FIG. 5(b) shows the structure of the fine channel device used for Comparative Example 1.
Figure 5B:
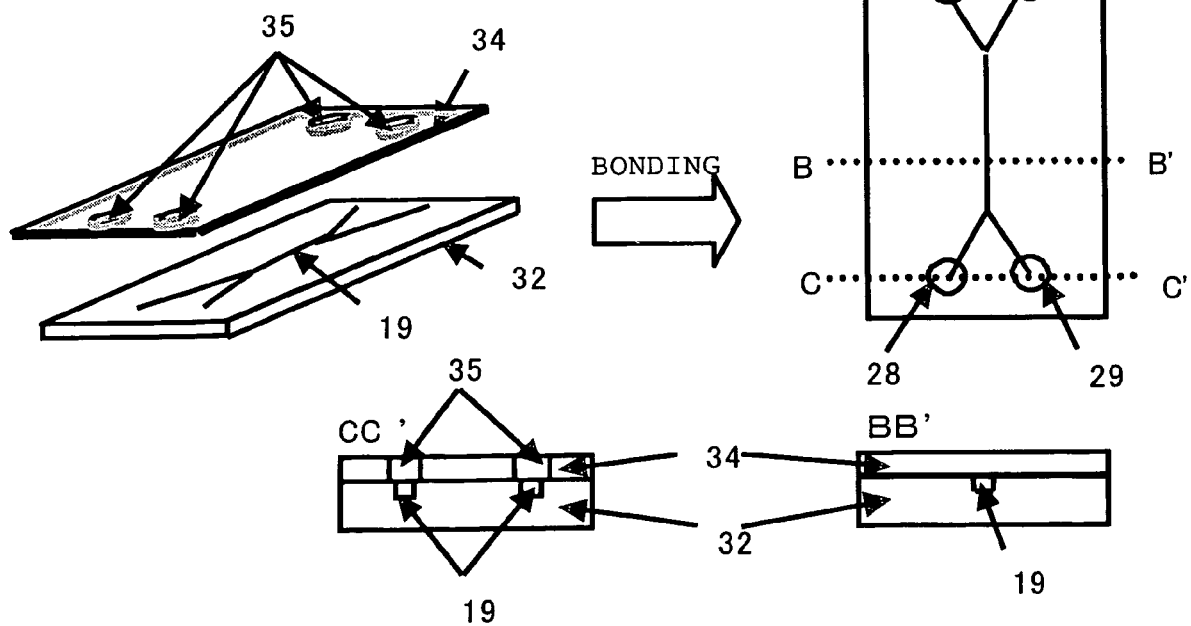

In Comparative Example 1, a fine channel device having the construction as shown in FIG. 5(b) was prepared. A fine channel 19 formed in the fine channel device was branched into two fine channel portions in a Y-letter like form at each side of fluid inlet and outlet ports. The inner structure of the fine channel was such that, as shown in FIG. 5(a), a guide-like portion 16 having a height of about 20% as much as the depth 17 of the fine channel was formed continuously along a flowing direction of fluid 37 at a substantially central portion with respect to a width direction of the fine channel. The width of the fine channel was 100 μm, the depth was 20 μm and the length was 30 mm. The thickness 36 of the guide-like portion 16 was about 5 μm.

As shown in FIG. 5(b), the fine channel was formed in a Pyrex (trademark) glass substrate 32 having a size of 70 mm×38 mm×1 mm (thick) according to conventional photo-lithographic and wet etching techniques, and a cover member 34 comprising a Pyrex (trademark) glass substrate having the same size as the fine channel substrate in which penetration holes 35 having a diameter of 0.6 mm were formed mechanically at positions corresponding to inlet ports A 28, B 29 and outlet ports C 30, D 31, was prepared. The cover member was thermally bonded on the fine channel substrate to seal hermitically the fine channel.

Water and cyclohexane were supplied respectively into the fine channel device at the same flow rate in a range of from 5 μL/min to 20 μL/min in the same manner as in Example 1. Water was supplied from an inlet port A 28 and cyclohexane was supplied from an inlet port B 29 under the above-mentioned flow rate condition, and an amount of cyclohexane in which an amount of water was contaminated discharged from an outlet port C 30 and an amount of water in which an amount of cyclohexane was contaminated discharged from an outlet port D 31 were measured by a graduated cylinder respectively. Table 1 shows a result of measurement. As a result, contamination percentages of water to cyclohexane and contamination percentages of cyclohexane to water showed very high values such as 30% or more even at any flow rate.

Further, by using the same fine channel device and in the same manner as Example 2, cyclohexane was supplied at a fixed flow rate of 8 μL/min, and water was supplied by changing the flow rate in a range of from 3 μL/min to 20 μL/min. Namely, water was supplied from the inlet port A 28 and cyclohexane was supplied from the inlet port B 29 under the above-mentioned flow rate condition so that a ratio of the flow rate of water to that of cyclohexane is in a range of from 0.375 to 2.5, and an amount of cyclohexane in which an amount of water was contaminated discharged from the outlet port C 30 and an amount of water in which an amount of cyclohexane was contaminated discharged from the outlet port D 31 were measured by a graduated cylinder respectively. Table 2 shows a result of measurement. As a result, contamination percentages of water to cyclohexane and contamination percentages of cyclohexane to water showed very high values such as 20% or more even at any flow rate ratio.

Example 3

Figure 6B:
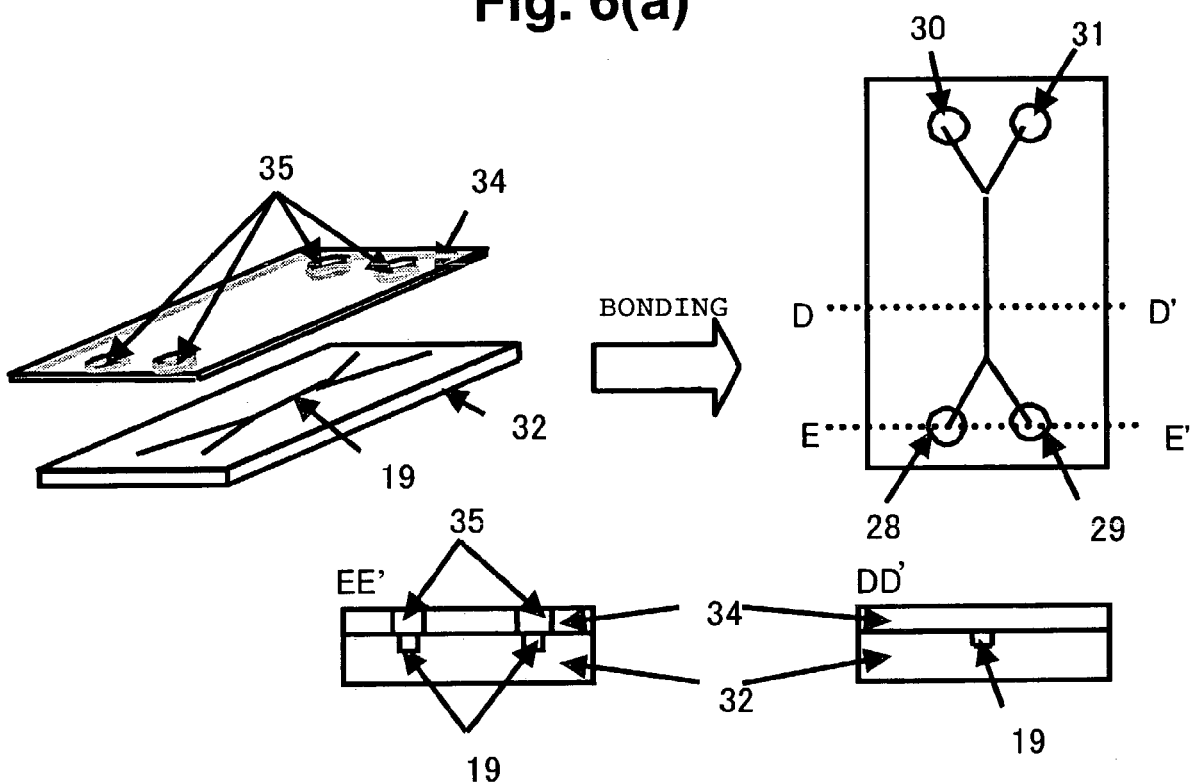
FIG. 6(b) shows the structure of the fine channel device used for Examples 1, 2, 3, 4, 5 and 6.

In Example 3, fine channel devices having the structure as shown in FIG. 6(b) and having the inner structure of fine channel as shown in FIG. 6(a), used in Example 1, were used wherein minimum distances between adjacent partition walls in a flowing direction of fluid were 200 μm and 400 μm. One side of the inner wall of the fine channel of each of the fine channel devices was subjected to a hydrophobic treatment according to the following procedures.

First, a saturated KOH-ethanol solution was supplied from the inlet port A 28 and the inlet port B 29 at a flow rate of 5 μL/min for about 30 min. Then, toluene was supplied from the inlet port A and a toluene solution of 10% octadecyltrichlorosilane was fed from the inlet port B at a flow rate of 5 μL/min for about 3 hr. As a result, one side of the inner wall of the fine channel through which only the toluene was supplied from the inlet port A to the outlet port C 30 was kept to have hydrophilic properties which was derived from the nature of the Pyrex (trademark) glass substrate itself, and the other side of the inner wall of the fine channel through which the toluene solution of 10% octadecyltrichlorosilane was fed from the inlet port B to the outlet port D 31 was modified to have hydrophobic properties.

Water and cyclohexane were supplied respectively at the same flow rate in a range of from 3 μL/min to 50 μL/min in a fine channel device having a minimum distance of 400 μm between adjacent partition walls in a flowing direction and having the fine channel in which one side of the fine channel was modified to have hydrophobic properties. Water was supplied from an inlet port A 28 and cyclohexane was supplied from an inlet port B 29 under the above-mentioned flow rate condition, and an amount of cyclohexane in which an amount of water was contaminated discharged from an outlet port C 30 and an amount of water in which an amount of cyclohexane was contaminated discharged from an outlet port D 31 were measured by a graduated cylinder respectively. Table 3 shows a result.

TABLE 3

| Flow rate (μL/min) Distance between adjacent partition walls (μm) | 3 | 5 | 8 | 10 | 20 | 50 |
|---|---|---|---|---|---|---|
| Contamination percentage of organic phase to aqueous phase (%) | | | | | | |
| 400 (no surface modification) | 41.7 | 27.6 | 0.0 | 0.0 | 0.0 | 0.0 |
| 400 (surface modification) | 0.0 | 0.0 | 4.1 | 0.0 | 0.0 | 0.0 |
| Contamination percentage of aqueous phase to organic phase (%) | | | | | | |
| 400 (no surface modification) | 33.6 | 14.3 | 3.1 | 3.7 | 0.0 | 9.1 |
| 400 (surface modification) | 1.4 | 0.7 | 0.6 | 1.1 | 1.3 | 7.4 |

Table 3 shows contamination percentages of fluid: a contamination percentage (%) of an organic phase to an aqueous phase and a contamination percentage (%) of an aqueous phase to an organic phase, at flow rates of 3, 5, 8, 10, 20 and 50 μL/min when both the aqueous phase and the organic phase are supplied under the same flow rate condition.

In the result shown in Table 3, contamination percentages decreased to less than 8% in the flow rate condition at a contamination percentage of less than 10% using the partition wall distance of 400 μm in Example 1.

Into a fine channel device having a minimum distance of 200 μm between adjacent partition walls in a flowing direction of fluid and having the fine channel in which one side of the fine channel was subjected to a hydrophobic treatment, cyclohexane was supplied at a fixed flow rate of 8 μL/min, and water was supplied by changing the flow rate in a range of from 3 μL/min to 20 μL/min. Namely, water was supplied from the inlet port A 28 and cyclohexane was supplied from the inlet port B 29 under the above-mentioned flow rate condition so that a ratio of the flow rate of water to that of cyclohexane was in a range of from 0.375 to 2.5, and an amount of cyclohexane in which an amount of water was contaminated discharged from the outlet port C 30 and an amount of water in which an amount of cyclohexane was contaminated discharged from the outlet port D 31 were measured by a graduated cylinder respectively. Table 4 shows a result.

TABLE 4

| Flow rate ratio Distance between adjacent partition walls (μm) | 0.375 | 0.625 | 1.000 | 1.250 | 2.500 |
|---|---|---|---|---|---|
| Contamination percentage of organic phase to aqueous phase (%) | | | | | |
| 200 (no surface modification) | 1.7 | 2.7 | 0.0 | 5.4 | 4.2 |
| 200 (surface modification) | 7.8 | 0.0 | 4.1 | 0.0 | 0.0 |
| Contamination percentage of aqueous phase to organic phase (%) | | | | | |
| 200 (no surface modification) | 0.5 | 0.7 | 9.6 | 8.7 | 54.3 |
| 200 (surface modification) | 0.0 | 0.0 | 0.6 | 1.3 | 16.3 |

Table 4 shows contamination percentages of fluid: a contamination percentage (%) of an organic phase to an aqueous phase and a contamination percentage (%) of an aqueous phase to an organic phase, at flow rate ratios of 0.375, 0.625, 1.000, 1.250 and 2.500 respectively.

As a result, contamination percentages decreased to less than 8% in the flow rate condition at a contamination percentage of less than 10% using the partition wall distance of 200 μm in Example 2.

Example 4

Figures 21A, 21B:
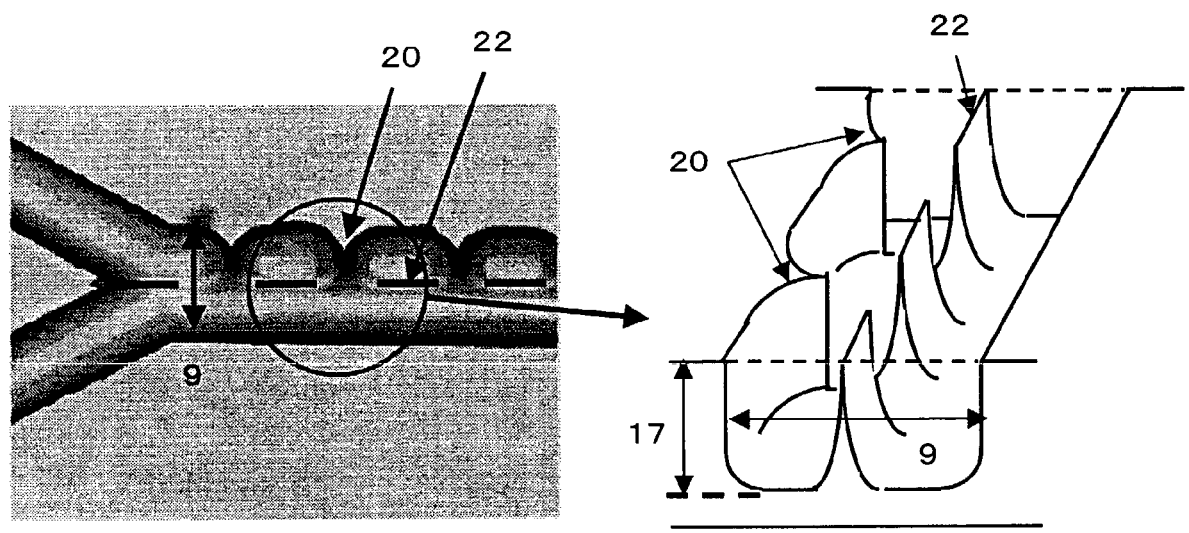
FIG. 21(a) is a SEM photograph of a plan view of the inner structure of the fine channel used for Examples 4 and 7 and FIG. 21(b) is a diagram showing the inner structure of the fine channel used for Examples 4 and 7.

In Example 4, a fine channel device having the construction as shown in FIG. 6(*b*) was used. In a fine channel 19 formed in the fine channel device, a branch portion branched into two fine channel portions in a Y-letter like form was formed at each side of fluid inlet and outlet ports. FIG. 21 shows the inner structure of the fine channel used in this Example. FIG. 21(*a*) is a SEM photograph taking the fine channel used in this Example from an upper side and FIG. 21(*b*) is a conceptual diagram showing the inner structure of the fine channel. The width of the fine channel was 240 μm, the depth was 60 μm and the length was 30 mm, and a large number of projections 20 of 30 μm long were formed at one side of the fine channel at sides of the inlet port A and the outlet port C. In a substantially central portion of the fine channel, partition walls 22 having the maximum length of 50 μm and a height of 60 μm were formed intermittently in a flowing direction of fluid with intervals of 50 μm.

In the same manner as Example 1, the fine channel 19 was formed in a Pyrex (trademark) glass substrate 32 having a size of 70 mm×38 mm×1 mm (thick) according to conventional photolithographic and wet etching techniques, and a cover member 34 comprising a Pyrex (trademark) glass substrate having the same size as the fine channel substrate in which penetration holes 35 having a diameter of 0.6 mm were formed mechanically at positions corresponding to inlet ports A 28, B 29 and outlet ports C 30, D 31, was prepared. The cover member was thermally bonded on the fine channel substrate to seal hermetically the fine channel.

Methylation of ethylenediamine by iodomethane was conducted by using the fine channel device. Namely, an aqueous phase comprising an aqueous ethylenediamine solution was fed from the inlet port A to one side of the fine channel where the projections 20 were formed, at a rate of 10 μL/min, and an organic phase comprising a butanol solution of iodomethane was fed from the inlet port B at a flow rate of 3 μL/min. The reaction system is a reaction system that ethylenediamine reacts with iodomethane to synthesize N-methylenediamine to be extracted to the aqueous phase. In the observation of the fine channel supplied with each solution from each inlet port with a microscope, the fluid boundary formed by the aqueous phase and the organic phase was seen. The aqueous phase and the organic phase could be separated at the branch portion at a fluid outlet port side, and the aqueous phase was discharged from the outlet port C and the organic phase was discharged from the outlet port D without causing substantial mutual contamination. Further, when the aqueous phase discharged from the outlet port C was taken in a test tube to analyze it with a high-speed liquid chromatography, it was observed that the ratio of the amount of ethylenediamine to the amount of N-methylenediamine was about 90:10. The conversion of N-methylenediamine in the reaction was about 10%.

Example 5

In Example 5, a fine channel device having the construction as shown in FIG. 6(*b*) was used. A fine channel 19 was formed in the fine channel device to have two fine channel portions branched in a Y-letter like form at each side of fluid inlet and outlet ports. The width of the fine channel 19 was 240 μm, the depth was 60 μm and the length was 30 mm. In a substantially central portion of the fine channel, partition walls 22 having the maximum length of 50 μm and a height of 60 μm were formed intermittently in a flowing direction of fluid with intervals of 50 μm as shown in FIG. 6(*a*).

In the same manner as Example 1, the fine channel 19 was formed in a Pyrex (trademark) glass substrate 32 having a size of 70 mm×38 mm×1 mm (thick) according to conventional photolithographic and wet etching techniques, and a cover member 34 comprising a Pyrex (trademark) glass substrate having the same size as the fine channel substrate in which penetration orifices 35 having a diameter of 0.6 mm were formed mechanically at positions corresponding to inlet ports A 28, B 29 and outlet ports C 30, D 31, was prepared. The cover member was thermally bonded on the fine channel substrate to seal hermetically the fine channel.

Methylation of ethylenediamine by iodomethane was conducted by using the fine channel device. Namely, an aqueous phase comprising an aqueous ethylenediamine solution in which fine silica particles having an average particle diameter of 5 μm were incorporated was fed from the inlet port A at a rate of 10 μL/min, and an organic phase comprising a butanol solution of iodomethane was fed from the inlet port B at a flow rate of 3 μL/min in a flowing direction 27 shown in FIG. 20, respectively. The reaction system is a reaction system that ethylenediamine reacts with iodomethane to synthesize N-methylenediamine to be extracted to the aqueous phase. In the observation of the fine channel supplied with each solution from each inlet port with a microscope, the fluid boundary formed by the aqueous phase and the organic phase was seen. The aqueous phase and the organic phase could be separated at the branch portion at a fluid outlet port side, and the aqueous phase was discharged from the outlet port C and the organic phase was discharged from the outlet port D without causing substantial mutual contamination. Further, when the aqueous phase discharged from the outlet port C was taken in a test tube to analyze it with a high-speed liquid chromatography, it was observed that the ratio of the amount of ethylenediamine to the amount of N-methylenediamine was about 90:10. The conversion of N-methylenediamine in the reaction was about 10%.

Example 6

In Example 6, a fine channel device having the construction as shown in FIG. 6(b) was used. A fine channel 19 was formed in the fine channel device to have two fine channel portions branched in a Y-letter like form at each side of fluid inlet and outlet ports. The width of the fine channel 19 was 240 µm, the depth was 60 µm and the length was 30 mm. The fine channel had an inner structure that partition walls 22 having a height of 60 µm were formed in a substantially central portion of the fine channel as shown in FIG. 6(a).

In the same manner as Example 1, the fine channel 19 was formed in a Pyrex (trademark) glass substrate 32 having a size of 70 mm×38 mm×1 mm (thick) according to conventional photolithographic and wet etching techniques, and a cover member 34 comprising a Pyrex (trademark) glass substrate having the same size as the fine channel substrate in which penetration orifices 35 having a diameter of 0.6 mm were formed mechanically at positions corresponding to inlet ports A 28, B 29 and outlet ports C 30, D 31, was prepared. The cover member was thermally bonded on the fine channel substrate to seal hermitically the fine channel.

Methylation of ethylenediamine by iodomethane was conducted by using the fine channel device. Namely, an aqueous phase comprising an aqueous ethylenediamine solution was fed from the inlet port A at a rate of 10 µL/min, and an organic phase comprising a butanol solution of iodomethane was fed from the inlet port B at a flow rate of 3 µL/min. In the observation of the fine channel supplied with each solution from each inlet port with a microscope, the fluid boundary formed by the aqueous phase and the organic phase was seen. The aqueous phase and the organic phase could be separated at the branch portion at a fluid outlet port side, and the aqueous phase was discharged from the outlet port C and the organic phase was discharged from the outlet port D without causing substantial mutual contamination. Further, when the aqueous phase discharged from the outlet port C was taken in a test tube to analyze it with a high-speed liquid chromatography, it was observed that the ratio of the amount of ethylenediamine to the amount of N-methylenediamine was about 93:7. The conversion of N-methylenediamine in the reaction was about 7%.

From results of Examples 4, 5 and 6, it is understood that the present invention can provide a fine channel device having a fine structure capable of separating at least two kinds of fluid at the branch portion at a side of the fluid outlet port of the fine channel without causing substantial mutual contamination while said at least two kinds of fluid, flowing as laminar flows, contact with each other at the fluid boundary which can be kept stably by the partition walls arranged with intervals and capable of stirring a fluid containing a raw material for reaction and/or a reaction product, or capable of proceeding a rapid chemical reaction, solvent extraction or separation by stirring a fine particle-containing fluid in the fine channel of the fine channel device, and a chemically operating method using such fine channel device.

Example 7

Figure 22A:
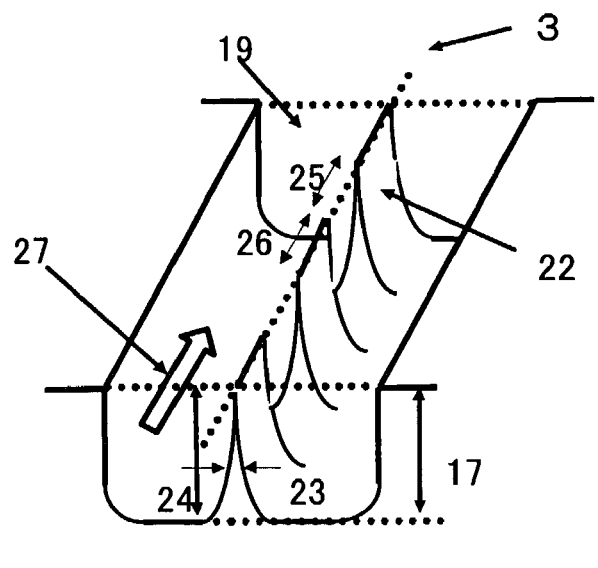
FIG. 22(a) is a diagram showing the inner structure of the fine channel used for Examples 8, 9 and 10
Figure 22B:
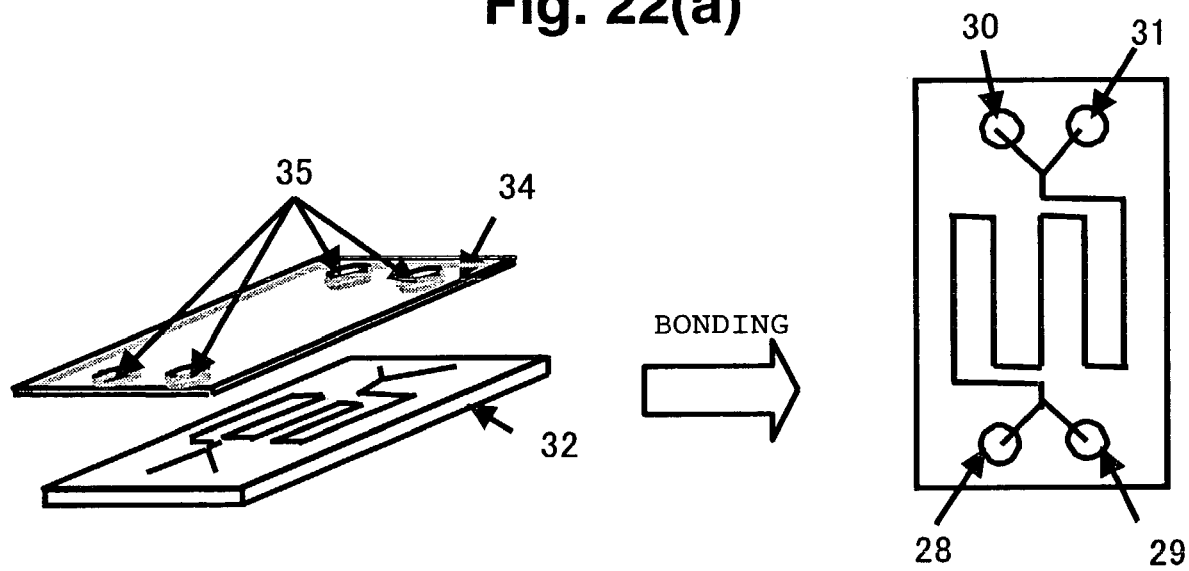
FIG. 22(b) shows the structure of the fine channel device used for Examples 7, 8, 9 and 10.

In Example 7, a decomposition reaction of p-chlorophenol by laccase having a function of decomposing environmental pollutants, as one of the catalytic reactions, was carried out by using the fine channel device shown in FIG. 22(b). The fine channel device used had a fine channel 19 having two Y-letter like branch portions, one of which was branched to two channel portions communicated with an inlet port A 28 and an inlet port B 29 and the other of which was branched to two fine channel portions communicated with an outlet port C 30 and an outlet port D 31. The width of the fine channel was 100 µm, the depth was 25 µm and the length was 400 mm. The inner structure of the fine channel was such that as shown in FIG. 21, a large number of projections 20 having a height of 30 µm were formed in one side of the fine channel at positions of each side of the inlet port A and the outlet port C, in the same manner as in Example 4. In a substantially central portion of the fine channel, partition walls 22 having the maximum length of 50 µm and a height of 25 µm were formed intermittently in a flowing direction of fluid with intervals of 50 µm.

By using the fine channel device, a decomposition reaction of p-chlorophenol by laccase having a function of decomposing environmental pollutants, as one of the catalytic reactions, was carried out. Namely, an isooctane solution containing 100 µM p-chlorophenol, as an organic phase, was fed to one side of the fine channel where the projections 20 were formed, at a flow rate of 5 µL/min from the inlet port A and a succinic acid buffer solution (pH: 5.0) containing 30 µM laccase, as an aqueous phase, was fed at a flow rate of 5 µL/min. Then, amounts of p-chlorophenol in both phases before and after the reaction were measured with a liquid chromatography.

As a result, it was found that the aqueous phase and the organic phase could be separated at the branch portion at a fluid outlet port side, and the aqueous phase was discharged from the outlet port C and the organic phase was discharged from the outlet port D without causing substantial mutual contamination. Further, the decomposition percentage of p-chlorophenol reached 82% in about 8 sec.

Example 8

In Example 8, a decomposition reaction of p-chlorophenol by laccase having a function of decomposing environmental pollutants, as one of the catalytic reactions, was carried out by using the fine channel device shown in FIG. 22(b). The fine channel device used had a fine channel 19 having two Y-letter like branch portions, one of which was branched to two channel portions communicated with an inlet port A 28 and an inlet port B 29 and the other of which was branched to two fine channel portions communicated with an outlet port C 30 and an outlet port D 31. The width of the fine channel was 100 µm, the depth was 25 µm and the length was 400 mm. The inner structure of the fine channel was such that as shown in FIG. 22(a), partition walls 22 having the maximum length of 50 µm and a height of 25 µm were formed intermittently in a flowing direction of fluid with intervals of 50 µm in a substantially central portion of the fine channel as shown in FIG. 22(a).

An isooctane solution containing 100 µM p-chlorophenol, as an organic phase, in which fine silica particles having an average particle size of 5 µm were incorporated was fed at a flow rate of 5 µL/min from the inlet port A, and a succinic acid buffer solution (pH: 5.0) containing 30 µM laccase, as an aqueous phase, was fed at a flow rate of 5 μL/min from the inlet port B. Then, amounts of p-chlorophenol in both phases before and after the reaction were measured with a liquid chromatography.

As a result, it was found that fluid separation could be achieved at the branch portion at a side of the fluid outlet port, and the aqueous phase was discharged from the outlet port C and the organic phase was discharged from the outlet port D without causing substantial mutual contamination. Further, the decomposition percentage of p-chlorophenol reached 85% in about 8 sec.

Example 9

In Example 9, a decomposition reaction of p-chlorophenol by laccase having a function of decomposing environmental pollutants, as one of the catalytic reactions, was carried out by using the fine channel device shown in FIG. 22(b). The fine channel device used had a fine channel 19 having two Y-letter like branch portions, one of which was branched to two channel portions communicated with an inlet port A 28 and an inlet port B 29 and the other of which was branched to two fine channel portions communicated with an outlet port C 30 and an outlet port D 31. The width of the fine channel was 100 μm, the depth was 25 μm and the length was 400 mm. The inner structure of the fine channel was such that as shown in FIG. 22(a), partition walls 22 having the maximum length of 50 μm and a height of 25 μm were formed intermediately in a flowing direction of fluid with intervals of 50 μm in a substantially central portion of the fine channel as shown in FIG. 22(a).

By using the fine channel device, an isooctane solution containing 100 μM p-chlorophenol, as an organic phase, was fed at a flow rate of 5 μL/min from the inlet port A and a succinic acid buffer solution (pH: 5.0) containing 30 μM laccase, as an aqueous phase, was fed at a rate of 5 μL/min. from the inlet port B. Then, amounts of p-chlorophenol in both phases before and after the reaction were measured with a liquid chromatography.

As a result, it was found that fluid separation could be achieved at the branch portion at a side of the fluid outlet port; the aqueous phase could be discharged from the outlet port C and the organic phase could be discharged from the outlet port D without causing substantial mutual contamination. Further, the decomposition percentage of p-chlorophenol reached 80% in about 8 sec.

From results of Examples 7, 8 and 9, it is understood that the present invention can provide a fine channel device having a fine structure capable of separating at least two kinds of fluid at the branch portion at a side of the fluid outlet port of the fine channel without causing substantial mutual contamination while said at least two kinds of fluid, flowing as laminar flows, contact with each other at the fluid boundary which can be kept stably by the partition walls arranged with intervals and capable of stirring a fluid containing a raw material for reaction and/or a reaction product, or capable of proceeding a rapid chemical reaction, solvent extraction or separation by stirring a fine particle-containing fluid in the fine channel of the fine channel device, and a chemically operating method using such fine channel device.

Example 10

In Example 10, a fine channel device as shown in FIG. 22(b) was prepared. The fine channel device used had a fine channel 19 having two Y-letter like branch portions, one of which was branched to two channel portions communicated with an inlet port A 28 and an inlet port B 29 and the other of which was branched to two fine channel portions communicated with an outlet port C 30 and an outlet port D 31. The width of the fine channel was 100 μm, the depth was 25 μm and the length was 400 mm. The inner structure of the fine channel was such that as shown in FIG. 22(a) partition walls 22 having the maximum length of 50 μm and a height of 25 μm were formed intermittently in a flowing direction of fluid with intervals of 50 μm in a substantially central portion of the fine channel.

The fine channel was formed in a Pyrex (trademark) glass substrate 32 having a size of 70 mm×38 mm×1 mm (thick) according to conventional photolithographic and wet etching techniques, and a cover member 34 comprising a Pyrex (trademark) glass substrate having the same size as the fine channel substrate in which penetration orifices 35 having a diameter of 0.6 mm were formed by mechanical processing means at positions corresponding to the inlet ports A 28, B 29 and outlet ports C 30, D 31, was prepared. The cover member was thermally bonded on the fine channel substrate to seal hermetically the fine channel. Thus, the fine channel device was prepared.

By using such fine channel device, a decomposition reaction of p-chlorophenol by laccase having a function of decomposing environmental pollutants, as one of the catalytic reactions, was carried out. A succinic acid buffer solution (pH: 5.0) containing 30 μM laccase, as an aqueous phase, was supplied at a flow rate of 5 μL/min from the inlet port A, and an isooctane solution containing 100 μM p-chlorophenol, as an organic phase, was supplied at a flow rate of 5 μL/min from the inlet port B. Amounts of p-chlorophenol in both phases before and after the reaction were measured with a liquid chromatography.

As a result, it was found that fluid separation could be achieved at the branch portion at a side of the fluid outlet port; the aqueous solution could be discharged from the outlet port C and the organic phase could be discharged from the outlet port D without causing substantially mutual contamination. Further, it took about 8 sec. until the decomposition of p-chlorophenol reached 80%. Further, when the degree of enzyme activity was measured by a phenolaminoantipyrine method (P-4AA method), the enzyme activity could maintain 90% or more even though such reaction was repeated 10 times.

Comparative Example 2

Into a sample bottle of 50 ml, 15 ml of a succinic acid buffer solution (pH: 5.0) containing 30 μM laccase, as an aqueous phase, and 15 ml of an isooctane solution containing 100 μM p-chlorophenol, as an organic phase were charged followed by stirring severely with a magnetic stirrer. Amounts of p-chlorophenol in both phases before and after the reaction were measured. As a result, it was found that it took about 30 min. until the decomposition of p-chlorophenol reached 80%. Further, when the degree of enzyme activity was measured by a phenolaminoantipyrine method (P-4AA method), the enzyme activity decreased to about 80% after a lapse of about 30 min, and degreased to about 5% after a lapse of about 90 min.

From result of Examples 10 and Comparative Example 2, it is understood that the present invention provides a rapid catalytic reaction, without requiring mechanically stirring, due to a large interfacial surface area and a short diffusion distance of molecules as a feature of the fine space, in the reaction wherein at least two kinds of fluid, flowing as laminar flows, contact with each other at the fluid boundary which can be kept stably by the partition walls arranged with intervals, and the recovery of enzyme for reuse without losing the enzyme activity due to a physical action such as mechanically stirring or a catalyst being suspended in an organic phase.

According to the present invention, the following advantages can be obtained.

The fine channel device of the present invention comprises a fine channel provided with at least two inlet ports for feeding fluid, inlet channels communicated with the inlet ports, a confluent portion communicated with the inlet channels, a branch portion communicated with the fine channel, from which at least two outlet channels are branched to feed predetermined amounts of fluid, and outlet ports communicated with the outlet channels, wherein the fine channel is provided with a plurality of partition walls arranged along the boundary formed by at least two kinds of fluid fed from the inlet ports so as not to cause mutual contamination of fluid. Accordingly, a change of the position of the fluid boundary due to a change of the flow rate per unit time which is caused by a liquid supply pump can be suppressed; a wraparound phenomenon of fluid due to a difference of affinity between the inner wall of the fine channel and fluid to be supplied can be prevented, and at least two kinds of fluid can be discharged through respective fluid outlet ports of the fine channel without causing mutually contamination.

Further, when flow rates of all kinds of fluid to be supplied to the fine channel are the same, and distances between adjacent partition walls arranged in a flowing direction of fluid are fixed to be a distance of a predetermined value or less (i.e., about 800 μm or less, preferably, about 400 μm or less), adjacent flows of fluid having the same viscosity can be discharged from outlet ports through the fine channel at a predetermined range of flow rate without causing the mutual contamination of fluid.

In a case that the ratio of the product of the viscosity coefficient and the flow rate of fluid having a relatively high affinity to the wall surface of the fine channel is different from the ratio of the product of the viscosity coefficient and the flow rate of fluid having a relatively low affinity to the wall surface of the fine channel and when the minimum distance between adjacent partition walls in a flowing direction of fluid is fixed to a predetermined distance or less (i.e., about 400 μm or less, preferably, about 200 μm or less), each flow of fluid can be discharged from an outlet port through the fine channel without causing the mutual contamination of fluid even though there are some fluctuations in the product of the viscosity coefficient and the flow rate of fluid having a relatively high affinity to the wall surface of the fine channel to the ratio of the product of the viscosity coefficient and the flow rate of fluid having a relatively low affinity to the wall surface of the fine channel.

Further, according to the present invention, the inner structure of the fine channel can be formed at the same time of the formation of the shape of the fine channel by using etching, mechanically processing or molding without requiring a large number of processes as in a conventional channel modification method. Accordingly, a time and cost for forming the fine channel can remarkably be reduced in comparison with the channel modification method. In particular, when the fine channel device of the present invention is fabricated by molding a material such as a resin, ceramics or glass, the effect of reducing the time and cost for forming the fine channel can be obtained at the maximum.

The above-mentioned effects depend basically on the shape of the fine channel formed in the fine channel device of the present invention. Accordingly, such effects can be realized only by the fine channel device of the present invention in which a fine channel capable of providing semipermanently services is formed. Further, since the partition wall located closest to the branch portion of the fine channel is connected to the branch portion, at least two kinds of fluid flowing adjacently can be separated smoothly to thereby suppress mutual contamination of fluid.

Further, when the fine channel of the present invention has a shape other than a straight shape, a partition wall portion in the portion having a shape other than a straight shape extends from the vicinity of a portion originating a non-straight portion of fine channel to the vicinity of a portion ending the non-straight portion of fine channel. Accordingly, such a phenomenon that a kind of fluid flowing an inner side of a curved fine channel is forced to push the other kind of fluid flowing at an outer side due to a centrifugal force to thereby cause contamination of fluid, can be prevented.

Further, when flow rates of all kinds of fluid to be supplied to the fine channel are the same, distances between adjacent partition walls arranged in a flowing direction of fluid are made smaller than a predetermined distance whereby these kinds of fluid having the same viscosity can be discharged at a predetermined range of flow rate from each outlet port through each outlet channel without causing mutual contamination of fluid.

Further, in two adjacent flows of fluid flowing in the fine channel, when the product of the viscosity coefficient and the flow rate of a fluid having a relatively high affinity to the wall surface of the fine channel is different from the product of the viscosity coefficient and the flow rate of a fluid having a relatively low affinity to the wall surface of the fine channel, the minimum distance between adjacent partition walls arranged in a flowing direction of fluid should be smaller than a predetermined distance. With such arrangement, even when the product of the viscosity coefficient and the flow rate of a fluid having a relatively high affinity to the wall surface of the fine channel, to the product of the viscosity coefficient and the flow rate of a fluid having a relatively low affinity to the wall surface of the fine channel varies about 30-40%, each flow of fluid can be discharged from each outlet port through each outlet channel without causing mutual contamination of fluid. Further, even in a case that the viscosity of each kind of fluid fluctuates in the progress of a chemical reaction and if the fluctuation of the viscosity is within the above-mentioned range, a stable fluid boundary formed by laminar flows of fluid can be maintained, and each fluid can be discharged from each outlet port through each outlet channel without causing mutual contamination of fluid.

In the fine channel device of the present invention, the affinity of the inner wall at one side of the fine channel partitioned by partition walls is different from the affinity of the inner wall at the other side of the fine channel partitioned by the partition walls. Accordingly, it is possible to suppress effectively a wraparound phenomenon that a kind of fluid having the affinity to the inner wall of the fine channel surrounds another kind of fluid without having the affinity to the inner wall of the fine channel. Then, the supplied fluid can certainly be separated and discharged from each outlet port without causing mutual contamination of fluid.

In addition to the above-mentioned effects obtainable only by the fine channel device of the present invention, the following accompanying effects can be expected.

In a first accompanying effect, since at least two kinds of fluid can effectively be separated from each other after they are passed through the fine channel without causing mutual contamination, a contact time, i.e., a mixing time and/or a chemical reaction time of said at least two kinds of fluid flowing adjacently in the fine channel, the contact time being determined by the length of the fine channel and/or a flow rate of fluid, can be determined only in the fine channel. Accordingly, the mixing and/or a chemical reaction can be stopped in the fine channel, and an intended chemical reaction can be realized without causing a consecutive reaction or a side reaction in the fine channel. Further, it is possible to recover a catalyst after a catalytic reaction while the activity of the catalyst can be maintained.

In a second accompanying effect, since at least two kinds of fluid flowing as adjacent laminar flows can effectively be separated and discharged without causing mutual contamination, a solvent extraction time can correctly controlled by the length of the fine channel and/or a flow rate of these fluid. Accordingly, the solvent extraction can be stopped only in the fine channel, and an extracting solvent in the fine channel can effectively be separated from an extracted solvent at the outside of the fine channel.

In a third accompanying effect, since a film is formed at the fluid boundary formed by at least two kinds of fluid as adjacent flows in the fine channel, selective permeability of a material in a kind of fluid through the film between two kinds of fluid adjacently flowing in the fine channel can be provided. Or, when a catalytic reaction or an enzyme reaction is carried out, a catalyst or an enzyme is immobilized on the film which is formed in the fine channel having a practical length of from several cm to several tens cm.

In a fourth accompanying effect, it is possible to supply at least two kinds of fluid adjacently flowing as laminar flows in the fine channel in mutually opposite directions. Accordingly, an experiment for verification as to whether or not an equilibrium of a chemical reaction or solvent extraction can be changed, can be conducted only by using the fine channel. Further, modification of the inner wall of the fine channel can be conducted at the same time of forming the shape of the fine channel by using a method of etching, mechanically processing or molding without requiring a large number of processes as in the conventional channel modification method, the time and cost for forming the fine channel can remarkably be reduced in comparison with the channel modification method. In particular, when the fine channel substrate of the present invention is fabricated by molding a material such as a resin, ceramics or glass, the maximum effect of reducing the time and cost for forming the fine channel can be obtained. Further, the above-mentioned effects are basically obtainable depending on the shape of the fine channel formed in the fine channel device of the present invention. Accordingly, such effects can be realized only by the fine channel device of the present invention in which the fine channel providing semi-permanent services is formed in comparison with the fine channel formed according to the conventional channel modification method.

In a fifth accompanying effect, since a plurality of projections projecting to such an extent capable of maintaining a flow of fluid are formed in the fine channel, or fine particles are mixed in a kind of fluid, it is possible to stir each kind of fluid while the fluid boundary formed by laminar flows of fluid can be kept stably, and a material contained in each flow of fluid can uniformly be dispersed in each flow.

The entire disclosures of Japanese Patent Application No. 2002-204271 filed on Jul. 12, 2002, Japanese Patent Application No. 2002-206745 filed on Jul. 16, 2002, Japanese Patent Application No. 2002-279149 filed on Sep. 25, 2002, and Japanese Patent Application No. 2003-032532 filed on Feb. 10, 2003 including specifications, claims, drawings and summaries are incorporated herein by reference in their entireties.

The invention claimed is:

1. A fine channel device comprising:
a fine channel provided with first and second inlet ports configured to feed fluid;
a fluid containing a catalyst disposed in the fine channel device;
first and second inlet channels communicated with the first and second inlet ports, respectively, wherein the fluid containing a catalyst flows from the first inlet port to the first inlet channel;
a confluent portion communicated with the first and second inlet channels;
a branch portion communicated with the fine channel, from which first and second outlet channels are branched and configured to feed predetermined amounts of fluid;
first and second outlet ports communicated with the first and second outlet channels, respectively; and
a circulating channel configured to feed the fluid containing a catalyst discharged from the first outlet port to the first inlet port,
wherein the fine channel includes a plurality of partition walls disposed along a boundary formed by at least two kinds of fluid fed from the inlet ports configured to not cause mutual contamination of fluid,
wherein each partition wall of the plurality of partition walls includes an elongated upper edge that extends along a line parallel to a fluid flow path within the fine channel,
wherein the plurality of partition walls are disposed at intervals in a flowing direction of fluid, said intervals are longer than an elongated length of each partition wall,
wherein intervals between the partition walls are present along the entire length of the fine channel except in the vicinity of the confluent portion and the vicinity of the branch portion of the fine channel, and wherein the partition walls include continuous partition walls disposed in the vicinity of the confluent portion and in the vicinity of the branch portion of the fine channel, and
wherein a thermal barrier is disposed between the confluent portion and the branch portion.

2. The fine channel device according to claim 1, wherein in the plurality of partition walls, the partition wall located closest to the confluent portion of the fine channel is connected to the confluent portion, and wherein intervals between adjacent partition walls in the vicinity of the inlet channels are smaller than intervals between adjacent partition walls in a central portion of the fine channel.

3. The fine channel device according to claim 1, wherein the height of partition walls is substantially the same as the depth of the fine channel.

4. The fine channel device according to claim 1, wherein partition walls are disposed at positions apart from the confluent portion and the branch portion.

5. The fine channel device according to claim 1, wherein in the plurality of partition walls, the partition wall disposed closest to the branch portion of the fine channel is connected to the branch portion, and wherein intervals between adjacent partition walls in the vicinity of the outlet channels are smaller than intervals between adjacent partition walls in a central portion of the fine channel.

6. The fine channel device according to claim 1, wherein a portion of the fine channel has a shape other than a straight shape, and said portion includes a wall disposed along the boundary that extends from the vicinity of a portion originating a non-straight portion of fine channel to the vicinity of a portion ending the non-straight portion of fine channel.

7. The fine channel device according to claim 1, wherein in the vicinity of at least one of the inlet channels or the outlet channels of the fine channel, at least two partition walls are connected continuously in a flowing direction of fluid.

8. The fine channel device according to claim 1, wherein a plurality of projections are disposed at the inner wall of the fine channel partitioned by partition walls to such an extent capable of maintaining a flow of fluid.

9. The fine channel device according to claim 1, wherein said first and second inlet ports for feeding fluid, said first and second inlet channels communicated with said first and second inlet ports, said first and second outlet channels and said first and second outlet ports communicated with said first and second outlet channels are configured so that the flowing direction of either one of at least two kinds of fluid fed in the fine channel is opposite to the flowing direction of the other of said at least two kinds of fluid fed adjacently in the fine channel.

10. The fine channel device according to claim 1, wherein the inner wall at one side of the fine channel partitioned by partition walls has at least one of hydrophilic or hydrophobic properties.

11. The fine channel device according to claim 10, wherein the inner wall includes a material that is configured to have hydrophilic properties that are different from hydrophilic properties of a fluid to be fed into the fine channel.

12. The fine channel device according to claim 1, wherein a film is disposed between adjacent partition walls in a flowing direction of fluid, said film including pores with a diameter that is smaller than any distance between adjacent partition walls.

13. The fine channel device according to claim 12, wherein the film includes at least one of a polymeric material or an inorganic material.

14. The fine channel device according to claim 1, wherein a metallic film is disposed in the entire or a part of the inner surface of at least one of the fine channel or the wall surface of the partition walls.

15. The fine channel device according to claim 14, which further comprises at least one of a current supply means or a voltage supply means for the metallic film.

16. The fine channel device according to claim 1, which further comprises a reservoir tank communicated with the circulating channel and a pump configured to store the supplied fluid temporally.

17. The fine channel device according to claim 1, which further comprises means for supplying energy to fluid flowing the fine channel.

18. The fine channel device according to claim 17, wherein said means for supplying energy to fluid is a heating device.

19. The fine device according to claim 18, wherein the heating device is disposed at an upstream side of the fine channel.

20. The fine channel device according to claim 1, wherein the catalyst is a phase transfer catalyst.

21. The fine channel device according to claim 20, wherein the catalyst is an energy dependence phase transfer catalyst.

22. The fine channel device according to claim 21, wherein the catalyst is a temperature dependence phase transfer catalyst.

23. A fine channel device comprising a plurality of fine channels each as described in any one of claims 1 to 5, 6 and 7 to 14 formed two-dimensionally or three dimensionally.

24. A fine channel device comprising;
a fine channel provided with first and second inlet ports configured to feed fluid;
a fluid containing a catalyst disposed in the fine channel device;
first and second inlet channels communicated with the first and second inlet ports, respectively, wherein the fluid containing a catalyst flows from the first inlet port to the first inlet channel;
a confluent portion communicated with the first and second inlet channels;
a branch portion communicated with the fine channel, from which first and second outlet channels are branched and configured to feed predetermined amounts of fluid;
first and second outlet ports communicated with the first and second outlet channels, respectively; and
a circulating channel configured to feed a fluid containing a catalyst discharged from the first outlet port to the first inlet port,
wherein the fine channel includes a plurality of partition walls, each partition wall with a height substantially the same as the depth of the fine channel, disposed along a boundary formed by at least two kinds of fluid fed from the inlet ports configured to not cause mutual contamination of fluid,
wherein each partition wall of the plurality of partition walls includes an elongated upper edge that extends along a line parallel to a fluid flow path within the fine channel,
wherein the plurality of partition walls are disposed at a distance that is greater than an elongated length of each partition wall,
wherein intervals between the partition walls are present along the entire length of the fine channel except in the vicinity of the confluent portion and the vicinity of the branch portion of the fine channel, and wherein the partition walls include continuous partition walls disposed in the vicinity of the confluent portion and in the vicinity of the branch portion of the fine channel, and
wherein a thermal barrier is disposed between the confluent portion and the branch portion.

25. A fine channel device comprising:
a fine channel provided with first and second inlet ports configured to feed fluid;
a fluid containing a catalyst disposed in the fine channel device;
first and second inlet channels communicated with the first and second inlet ports, respectively, wherein the fluid containing a catalyst flows from the first inlet port to the first inlet channel;
a confluent portion communicated with the first and second inlet channels;
a branch portion communicated with the fine channel, from which first and second outlet channels are branched and configured to feed predetermined amounts of fluid;
first and second outlet ports communicated with the first and second outlet channels, respectively;
a circulating channel configured to feed the fluid containing a catalyst discharged from the first outlet port to the first inlet port;
means for supplying energy to fluid flowing the fine channel; and
a mask;
wherein the fine channel includes a plurality of partition walls disposed along a boundary formed by at least two kinds of fluid fed from the inlet ports configured to not cause mutual contamination of fluid, wherein each partition wall of the plurality of partition walls includes an elongated upper edge that extends along a line parallel to a fluid flow path within the fine channel, wherein the plurality of partition walls are disposed at intervals in a flowing direction of fluid, said intervals are longer than an elongated length of each partition wall, wherein intervals between the partition walls are present along the entire length of the fine channel except in the vicinity of the confluent portion and the vicinity of the branch portion of the fine channel, and wherein the partition walls include continuous partition walls disposed in the vicinity of the confluent portion and in the vicinity of the branch portion of the fine channel, wherein said means for supplying energy is a light irradiation device configured to irradiate light on a portion of the fine channel through the mask.

26. A fine channel device comprising:

a fine channel provided with first and second inlet ports configured to feed fluid;

a fluid containing a catalyst disposed in the fine channel device;

first and second inlet channels communicated with the first and second inlet ports, respectively, wherein the fluid containing a catalyst flows from the first inlet port to the first inlet channel;

a confluent portion communicated with the first and second inlet channels;

a branch portion communicated with the fine channel, from which first and second outlet channels are branched and configured to feed predetermined amounts of fluid;

first and second outlet ports communicated with the first and second outlet channels, respectively;

a circulating channel configured to feed the fluid containing a catalyst discharged from the first outlet port to the first inlet port; and means for supplying energy to fluid flowing the fine channel, wherein the fine channel includes a plurality of partition walls disposed along a boundary formed by at least two kinds of fluid fed from the inlet ports configured to not cause mutual contamination of fluid, wherein each partition wall of the plurality of partition walls includes an elongated upper edge that extends along a line parallel to a fluid flow path within the fine channel, wherein the plurality of partition walls are disposed at intervals in a flowing direction of fluid, said intervals are longer than an elongated length of each partition wall, wherein intervals between the partition walls are present along the entire length of the fine channel except in the vicinity of the confluent portion and the vicinity of the branch portion of the fine channel, and wherein the partition walls include continuous partition walls disposed in the vicinity of the confluent portion and in the vicinity of the branch portion of the fine channel, wherein said means for supplying energy to fluid is a heating device, wherein the heating device is disposed at an upstream side of the fine channel, and wherein a heat insulation material is embedded in the fine channel device at a downstream side of the fine channel.

* * * * *

UNITED STATES PATENT AND TRADEMARK OFFICE
CERTIFICATE OF CORRECTION

PATENT NO.      : 7,641,871 B2                                  Page 1 of 1
APPLICATION NO. : 10/615976
DATED           : January 5, 2010
INVENTOR(S)     : Futami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Sixteenth Day of November, 2010

David J. Kappos
*Director of the United States Patent and Trademark Office*